United States Patent
Koo et al.

(10) Patent No.: US 11,729,390 B2
(45) Date of Patent: Aug. 15, 2023

(54) IMAGE ENCODING/DECODING METHOD AND DEVICE THEREFOR

(71) Applicant: LG Electronics Inc., Seoul (KR)

(72) Inventors: Moonmo Koo, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/605,094

(22) PCT Filed: Mar. 13, 2018

(86) PCT No.: PCT/KR2018/002952
§ 371 (c)(1),
(2) Date: Oct. 14, 2019

(87) PCT Pub. No.: WO2018/190523
PCT Pub. Date: Oct. 18, 2018

(65) Prior Publication Data
US 2021/0105477 A1  Apr. 8, 2021

Related U.S. Application Data

(60) Provisional application No. 62/484,900, filed on Apr. 13, 2017.

(51) Int. Cl.
*H04N 19/129* (2014.01)
*H04N 19/119* (2014.01)
*H04N 19/13* (2014.01)
*H04N 19/176* (2014.01)
*H04N 19/30* (2014.01)

(52) U.S. Cl.
CPC ......... *H04N 19/129* (2014.11); *H04N 19/119* (2014.11); *H04N 19/13* (2014.11); *H04N 19/176* (2014.11); *H04N 19/30* (2014.11)

(58) Field of Classification Search
CPC .... H04N 19/129; H04N 19/18; H04N 19/176; H04N 19/119; H04N 19/96
See application file for complete search history.

(56) References Cited

U.S. PATENT DOCUMENTS 8,649,624 B2 *  2/2014  Kim .................. H04N 19/50
                                                 382/280
9,100,646 B2 *  8/2015  Kim .................. H04N 19/61
(Continued)

FOREIGN PATENT DOCUMENTS

CA        2849028       5/2013
CN       104272735      1/2013
(Continued)

OTHER PUBLICATIONS

Korean Office Action in Korean Application No. 10-2019-7033091, dated Mar. 17, 2020, 10 pages (with English translation).
(Continued)

*Primary Examiner* — Daniel Chang
(74) *Attorney, Agent, or Firm* — Fish & Richardson P.C.

(57) ABSTRACT

An image decoding method includes splitting a current block into a plurality of coefficient groups based on the current block is the non-square block, wherein the plurality of coefficient groups include a non-square coefficient group, obtaining coefficients corresponding to the plurality of coefficient groups based on a first scan order and a second scan order, wherein the first scan order represents a scan order among coefficients of the non-square coefficient group and wherein the second scan order represents a scan order among the plurality of coefficient groups, and reconstructing the image based on the coefficients.

5 Claims, 18 Drawing Sheets

(56) References Cited

U.S. PATENT DOCUMENTS

| | | | |
|---|---|---|---|
| 2008/0310745 A1 | 12/2008 | Ye et al. | |
| 2010/0177822 A1 | 7/2010 | Karczewicz et al. | |
| 2011/0038412 A1* | 2/2011 | Jung | H04N 19/132 375/240.12 |
| 2011/0310973 A1* | 12/2011 | Cheon | H04N 19/18 375/240.18 |
| 2012/0099646 A1 | 4/2012 | Coban et al. | |
| 2012/0230417 A1* | 9/2012 | Sole Rojals | H04N 19/91 375/240.18 |
| 2013/0003824 A1* | 1/2013 | Guo | H04N 19/46 375/240.18 |
| 2013/0003834 A1* | 1/2013 | Rojals | H04N 19/44 375/240.18 |
| 2013/0003835 A1* | 1/2013 | Sole Rojals | H04N 19/129 375/240.18 |
| 2013/0003857 A1* | 1/2013 | Yu | H04N 19/63 375/240.18 |
| 2013/0028329 A1* | 1/2013 | Lou | H04N 19/176 375/240.18 |
| 2013/0051459 A1* | 2/2013 | Kirchhoffer | H04N 19/51 375/240.07 |
| 2013/0051475 A1* | 2/2013 | Joshi | H04N 19/129 375/240.18 |
| 2013/0058401 A1* | 3/2013 | Song | H04N 19/82 375/E7.193 |
| 2013/0064294 A1* | 3/2013 | Sole Rojals | H04N 19/93 375/240.18 |
| 2013/0064417 A1* | 3/2013 | Fernandes | G06V 20/47 382/100 |
| 2013/0083856 A1* | 4/2013 | Sole Rojals | H04N 19/91 375/240.18 |
| 2013/0107950 A1* | 5/2013 | Guo | H04N 19/122 375/240.12 |
| 2013/0114692 A1* | 5/2013 | Sze | H04N 19/176 375/240.03 |
| 2013/0114730 A1* | 5/2013 | Joshi | H04N 19/156 375/240.18 |
| 2013/0128972 A1* | 5/2013 | Yamaguchi | H04N 19/44 375/240.12 |
| 2013/0182757 A1* | 7/2013 | Karczewicz | H04N 19/13 375/240.18 |
| 2013/0182773 A1* | 7/2013 | Seregin | H04N 19/119 375/240.18 |
| 2013/0188688 A1* | 7/2013 | Panusopone | H04N 19/13 375/240.24 |
| 2013/0188700 A1* | 7/2013 | Guo | H04N 19/50 375/240.12 |
| 2013/0195200 A1* | 8/2013 | Nguyen | H04N 19/18 375/E7.027 |
| 2013/0215970 A1* | 8/2013 | Fang | H04N 19/60 375/240.18 |
| 2013/0230098 A1* | 9/2013 | Song | H04N 19/176 375/240.03 |
| 2013/0272378 A1* | 10/2013 | Sole Rojals | H04N 19/167 375/240.02 |
| 2013/0272379 A1* | 10/2013 | Sole Rojals | H03M 7/40 375/240.02 |
| 2013/0272381 A1* | 10/2013 | Guo | H04N 19/119 375/240.12 |
| 2013/0287116 A1* | 10/2013 | Helle | H04N 19/93 375/240.24 |
| 2013/0336385 A1* | 12/2013 | Budagavi | H04N 19/156 375/240.2 |
| 2013/0343448 A1 | 12/2013 | He et al. | |
| 2014/0003529 A1* | 1/2014 | Joshi | H04N 19/60 375/240.18 |
| 2014/0092983 A1* | 4/2014 | Joshi | H04N 19/70 375/240.18 |
| 2014/0269908 A1* | 9/2014 | Oh | H04N 19/13 375/240.03 |
| 2014/0307784 A1* | 10/2014 | Lee | H04N 19/44 375/240.03 |
| 2014/0314143 A1* | 10/2014 | Lee | H04N 19/18 375/240.02 |
| 2014/0362926 A1* | 12/2014 | Rosewarne | H04N 19/176 375/240.18 |
| 2015/0016550 A1* | 1/2015 | Kim | H04N 19/86 375/240.29 |
| 2015/0063454 A1* | 3/2015 | Guo | H04N 19/176 375/240.12 |
| 2015/0071359 A1* | 3/2015 | Guo | H04N 19/91 375/240.18 |
| 2015/0078447 A1* | 3/2015 | Gamei | H04N 19/117 375/240.12 |
| 2015/0264386 A1* | 9/2015 | Pang | H04N 19/463 375/240.16 |
| 2015/0271487 A1* | 9/2015 | Li | H04N 19/58 375/240.02 |
| 2015/0271515 A1* | 9/2015 | Pang | H04N 19/70 375/240.16 |
| 2015/0271517 A1* | 9/2015 | Pang | H04N 19/52 375/240.16 |
| 2015/0373362 A1* | 12/2015 | Pang | H04N 19/159 375/240.16 |
| 2016/0029035 A1* | 1/2016 | Nguyen | H04N 19/44 375/240.12 |
| 2016/0295242 A1 | 10/2016 | Sole Rojas et al. | |
| 2016/0337661 A1* | 11/2016 | Pang | H04N 19/57 |
| 2017/0094313 A1 | 3/2017 | Zhao et al. | |
| 2017/0094314 A1* | 3/2017 | Zhao | H04N 19/625 |
| 2017/0150186 A1* | 5/2017 | Zhang | H04N 19/625 |
| 2017/0324951 A1* | 11/2017 | Raveendran | G02B 27/0093 |
| 2018/0034472 A1* | 2/2018 | Marpe | H03M 7/46 |
| 2018/0131962 A1* | 5/2018 | Chen | H04N 19/186 |
| 2018/0310001 A1* | 10/2018 | Choi | H04N 19/176 |
| 2018/0324434 A1* | 11/2018 | Piao | H04N 19/176 |
| 2019/0089961 A1* | 3/2019 | Ahn | H04N 19/18 |
| 2019/0141327 A1* | 5/2019 | Oh | H04N 19/61 |
| 2019/0215524 A1* | 7/2019 | Lee | H04N 19/30 |
| 2019/0253735 A1* | 8/2019 | Lasserre | H04N 19/132 |
| 2019/0281297 A1* | 9/2019 | Lee | H04N 19/50 |
| 2019/0313108 A1* | 10/2019 | Zhang | H04N 19/159 |
| 2021/0385456 A1* | 12/2021 | Kim | H04N 19/136 |

FOREIGN PATENT DOCUMENTS

| | | |
|---|---|---|
| CN | 103220516 | 7/2013 |
| CN | 104081774 | 10/2014 |
| CN | 106028045 | 10/2016 |
| CN | 106254880 | 12/2016 |
| CN | 110622511 | 12/2019 |
| EP | 0742986 A4 | 12/2000 |
| EP | 3609183 | 2/2020 |
| JP | 2013-087869 | 5/2013 |
| JP | 2013110740 | 6/2013 |
| JP | 2013187869 | 9/2013 |
| JP | 2015-516767 | 6/2015 |
| JP | 2015516767 | 6/2015 |
| JP | 6949990 | 10/2021 |
| KR | 20010069018 | 7/2001 |
| KR | 20130006678 | 1/2013 |
| KR | 20140028118 | 3/2014 |
| KR | 1020150003319 | 1/2015 |
| KR | 102302797 | 9/2021 |
| KR | 102424411 | 7/2022 |
| RU | 2446615 C2 | 3/2012 |
| RU | 2447612 | 4/2012 |
| RU | 2482616 | 5/2013 |
| WO | WO2016200234 | 12/2016 |

OTHER PUBLICATIONS

NHK, "Direction-dependent scan order with JEM tools," JVET-C0069, Joint Video Exploration Team (JVET) of ITU-T SG 16 WP 3 and ISO/IEC JTC 1/SC 29/WG11, 3rd Meeting: Geneva, CH, May 26-Jun. 1, 2016, 7 pages.

Japanese Office Action in Japanese Appln. No. 2019-556231, dated Dec. 15, 2020, 6 pages (with English translation).

(56) References Cited

OTHER PUBLICATIONS

Extended European Search Report in European Application No. 18784722.3, dated May 12, 2020, 10 pages.
JCT-VC, "Test Model under Consideration," JCTVC-B205, Joint Collaborative Team on Video Coding (JCT-VC) of ITU-T SG16 WP3 and ISO/IEC JTC1/SC29/WG11, Geneva, CH, dated Jul. 21-28, 2010, 179 pages, XP055322849.
Sole et al., "Transform Coefficient Coding in HEVC," IEEE Transactions On Circuits and Systems for Video Technology, vol. 22, No. 12, dated Dec. 2012, 13 pages, XP055562211.
Sony Electronics Inc., "Additional horizontal and vertical scan for transform coefficients," JCTVC-J0281, Joint Collaborative Team on Video Coding (JCT-VC) of ITU-T SG 16 WP 3 and 1S0/IEC JTC 1/SC 29/WG 11, Stockholm, SE, dated Jul. 11-20, 2012, 15 pages, XP030112643.
Weerakkody et al., "Mirroring of Coefficients for Transform Skipping in Video Coding," British Broadcasting Corporation, Research and Development Department, London, UK, dated Sep. 30, 2013, 4 pages, XP032524290.
Russian Office Action in Russian Appln. No. 2019135696, dated Jun. 1, 2020, 16 pages (with English translation).
AU Office Action in Australian Appln. No. 2018252853, dated Jul. 16, 2021, 4 pages.
KR Notice of Allowance in Korean Appln. No. 10-2019-7033091, dated Feb. 22, 2021, 4 pages (with English translation).
IN Office Action in Indian Appln. No. 201927046004, dated May 24, 2021, 7 pages (with English translation).
Chinese Office Action in Chinese Appln. No. 201880031909.X, dated Apr. 25, 2021, 22 pages (with English translation).
Office Action in Korean Appln. No. 10-2021-7029105, dated Sep. 10, 2021, 7 pages (with English translation).
Notice of Allowance in Chinese Appln. No. 201880031909.X, dated Jan. 10, 2022, 6 pages (with English translation).
Office Action in Russian Appln. No. 2021109778, dated Sep. 9, 2021, 4 pages (with English translation).
Office Action in Mexican Appln. No. MXa2019012294, dated Jan. 3, 2023, 8 pages (with English translation).
Office Action in Japanese Appln. No. 2021-153969, dated Nov. 29, 2022, 7 pages (with English translation).
Office Action in Vietnamese Appln. No. 1-2019-06290, dated Sep. 30, 2022, 3 pages (with English translation).
Office Action in Korean Appln. No. 10-2022-7025143, dated Jan. 30, 2023, 6 pages (with English translation).
Office Action in Canadian Appln. No. 3060201, dated Apr. 21, 2022, 5 pages.
Office Action in Indonesian Appln. No. HKI-3-KI.05.01.08-TA-P00201909715, dated Aug. 12, 2022, 4 pages (with English translation).

\* cited by examiner

Intra:

2Nx2N

NxN

Inter:

2Nx2N

NxN

2NxN

Nx2N nLx2N nRx2N

2NxnU

2NxnD

FIG. 7

| 701 CG1 | | | | 702 CG2 | | | |
|---|---|---|---|---|---|---|---|
| 1 | 3 | 6 | 10 | 33 | 35 | 38 | 42 |
| 2 | 5 | 9 | 13 | 34 | 37 | 41 | 45 |
| 4 | 8 | 12 | 15 | 36 | 40 | 44 | 47 |
| 7 | 11 | 14 | 16 | 39 | 43 | 46 | 48 |
| 17 | 19 | 22 | 26 | 49 | 51 | 54 | 58 |
| 18 | 21 | 25 | 29 | 50 | 53 | 57 | 61 |
| 20 | 24 | 28 | 31 | 52 | 56 | 60 | 63 |
| 23 | 27 | 30 | 32 | 55 | 59 | 62 | 64 |
| 703 CG3 | | | | 704 CG4 | | | |

| 1 | 2 | 3 | 4 |
|---|---|---|---|
| 5 | 6 | 7 | 8 |
| 9 | 10 | 11 | 12 |
| 13 | 14 | 15 | 16 |

| 1 | 2 | 4 | 6 | 9 | 12 | 16 | 20 |
|---|---|---|---|---|----|----|----|
| 3 | 5 | 8 | 11 | 15 | 19 | 23 | 26 |
| 7 | 10 | 14 | 18 | 22 | 25 | 28 | 30 |
| 13 | 17 | 21 | 24 | 27 | 29 | 31 | 32 |

(a) SCAN INDEX FOR 4 X 8 BLOCKS

| $d_y$ \ $d_x$ | 0 | 1 | 2 | 3 | 4 | 5 | 6 | 7 |
|---|---|---|---|---|---|---|---|---|
| 0 | 1 | 2 | 4 | 6 | 9 | 12 | 16 | 20 |
| 2 | 3 | 5 | 8 | 11 | 15 | 19 | 23 | 26 |
| 4 | 7 | 10 | 14 | 18 | 22 | 25 | 28 | 30 |
| 6 | 13 | 17 | 21 | 24 | 27 | 29 | 31 | 32 |

(b) DX, DY FOR 4 X 8 BLOCKS (D = DX + DY)

| scan index | d | row index | column index |
|---|---|---|---|
| 1 | 0 | 1 | 1 |
| 2 | 1 | 1 | 2 |
| 3 | 2 | 2 | 1 |
| 4 | 2 | 1 | 3 |
| 5 | 3 | 2 | 2 |
| 6 | 3 | 1 | 4 |
| 7 | 4 | 3 | 1 |
| 8 | 4 | 2 | 3 |
| 9 | 4 | 1 | 5 |
| 10 | 5 | 3 | 2 |
| 11 | 5 | 2 | 4 |
| 12 | 5 | 1 | 6 |
| 13 | 6 | 4 | 1 |
| 14 | 6 | 3 | 3 |
| 15 | 6 | 2 | 5 |
| 16 | 6 | 1 | 7 |
| 17 | 7 | 4 | 2 |
| 18 | 7 | 3 | 4 |
| 19 | 7 | 2 | 6 |
| 20 | 7 | 1 | 8 |
| 21 | 8 | 4 | 3 |
| 22 | 8 | 3 | 5 |
| 23 | 8 | 2 | 7 |
| 24 | 9 | 4 | 4 |
| 25 | 9 | 3 | 6 |
| 26 | 9 | 2 | 8 |
| 27 | 10 | 4 | 5 |
| 28 | 10 | 3 | 7 |
| 29 | 11 | 4 | 6 |
| 30 | 11 | 3 | 8 |
| 31 | 12 | 4 | 7 |
| 32 | 13 | 4 | 8 |

(c) D VALUE AND POSITION FOR EACH SCAN INDEX FOR 4 X 8 BLOCKS

FIG. 15

(a) SCAN INDEX FOR 8 X 4 BLOCKS

| 1 | 4 | 9 | 16 |
|---|---|---|---|
| 2 | 6 | 12 | 20 |
| 3 | 8 | 15 | 23 |
| 5 | 11 | 19 | 26 |
| 7 | 14 | 22 | 28 |
| 10 | 18 | 25 | 30 |
| 13 | 21 | 27 | 31 |
| 17 | 24 | 29 | 32 |

(b) DX, DY FOR 8 X 4 BLOCKS (D = DX + DY)

| dx / dy | 0 | 2 | 4 | 6 |
|---|---|---|---|---|
| 0 | 1 | 4 | 9 | 16 |
| 1 | 2 | 6 | 12 | 20 |
| 2 | 3 | 8 | 15 | 23 |
| 3 | 5 | 11 | 19 | 26 |
| 4 | 7 | 14 | 22 | 28 |
| 5 | 10 | 18 | 25 | 30 |
| 6 | 13 | 21 | 27 | 31 |
| 7 | 17 | 24 | 29 | 32 |

(c) D VALUE AND POSITION FOR EACH SCAN INDEX FOR 8 X 4 BLOCKS

| scan index | d | row index | column index |
|---|---|---|---|
| 1 | 0 | 1 | 1 |
| 2 | 1 | 1 | 2 |
| 3 | 2 | 2 | 1 |
| 4 | 2 | 1 | 3 |
| 5 | 3 | 2 | 2 |
| 6 | 3 | 1 | 4 |
| 7 | 4 | 3 | 1 |
| 8 | 4 | 2 | 3 |
| 9 | 4 | 1 | 5 |
| 10 | 5 | 3 | 2 |
| 11 | 5 | 2 | 4 |
| 12 | 5 | 1 | 6 |
| 13 | 6 | 4 | 1 |
| 14 | 6 | 3 | 3 |
| 15 | 6 | 2 | 5 |
| 16 | 6 | 1 | 7 |
| 17 | 7 | 4 | 2 |
| 18 | 7 | 3 | 4 |
| 19 | 7 | 2 | 6 |
| 20 | 7 | 1 | 8 |
| 21 | 8 | 4 | 3 |
| 22 | 8 | 3 | 5 |
| 23 | 8 | 2 | 7 |
| 24 | 9 | 4 | 4 |
| 25 | 9 | 3 | 6 |
| 26 | 9 | 2 | 8 |
| 27 | 10 | 4 | 5 |
| 28 | 10 | 3 | 7 |
| 29 | 11 | 4 | 6 |
| 30 | 11 | 3 | 8 |
| 31 | 12 | 4 | 7 |
| 32 | 13 | 4 | 8 |

(a) SCAN INDEX FOR 4 X 8 BLOCKS (b) DX, DY FOR 4 X 8 BLOCKS (D = DX + DY)

| scan index | d | row index | column index |
|---|---|---|---|
| 1 | 0 | 1 | 1 |
| 2 | 0 | 1 | 2 |
| 3 | 1 | 2 | 1 |
| 4 | 1 | 2 | 2 |
| 5 | 1 | 1 | 3 |
| 6 | 1 | 1 | 4 |
| 7 | 2 | 3 | 1 |
| 8 | 2 | 3 | 2 |
| 9 | 2 | 2 | 3 |
| 10 | 2 | 2 | 4 |
| 11 | 2 | 1 | 5 |
| 12 | 2 | 1 | 6 |
| 13 | 3 | 4 | 1 |
| 14 | 3 | 4 | 2 |
| 15 | 3 | 3 | 3 |
| 16 | 3 | 3 | 4 |
| 17 | 3 | 2 | 5 |
| 18 | 3 | 2 | 6 |
| 19 | 3 | 1 | 7 |
| 20 | 3 | 1 | 8 |
| 21 | 4 | 4 | 3 |
| 22 | 4 | 4 | 4 |
| 23 | 4 | 3 | 5 |
| 24 | 4 | 3 | 6 |
| 25 | 4 | 2 | 7 |
| 26 | 4 | 2 | 8 |
| 27 | 5 | 4 | 5 |
| 28 | 5 | 4 | 6 |
| 29 | 5 | 3 | 7 |
| 30 | 5 | 3 | 8 |
| 31 | 6 | 4 | 7 |
| 32 | 6 | 4 | 8 |

(c) D VALUE AND POSITION FOR EACH SCAN INDEX FOR 4 X 8 BLOCKS

FIG. 17

| scan index | d | row index | column index |
|---|---|---|---|
| 1 | 0 | 1 | 1 |
| 2 | 0 | 2 | 1 |
| 3 | 1 | 3 | 1 |
| 4 | 1 | 4 | 1 |
| 5 | 1 | 1 | 2 |
| 6 | 1 | 2 | 2 |
| 7 | 2 | 5 | 1 |
| 8 | 2 | 6 | 1 |
| 9 | 2 | 3 | 2 |
| 10 | 2 | 4 | 2 |
| 11 | 2 | 1 | 3 |
| 12 | 2 | 2 | 3 |
| 13 | 3 | 7 | 1 |
| 14 | 3 | 8 | 1 |
| 15 | 3 | 5 | 2 |
| 16 | 3 | 6 | 2 |
| 17 | 3 | 3 | 3 |
| 18 | 3 | 4 | 3 |
| 19 | 3 | 1 | 4 |
| 20 | 3 | 2 | 4 |
| 21 | 4 | 7 | 2 |
| 22 | 4 | 8 | 2 |
| 23 | 4 | 5 | 3 |
| 24 | 4 | 6 | 3 |
| 25 | 4 | 3 | 4 |
| 26 | 4 | 4 | 4 |
| 27 | 5 | 7 | 3 |
| 28 | 5 | 8 | 3 |
| 29 | 5 | 5 | 4 |
| 30 | 5 | 6 | 4 |
| 31 | 6 | 7 | 4 |
| 32 | 6 | 8 | 4 |

(a) SCAN INDEX FOR 8 X 4 BLOCKS (b) DX, DY FOR 8 X 4 BLOCKS (D = DX + DY)

(c) D VALUE AND POSITION FOR EACH SCAN INDEX FOR 8 X 4 BLOCKS

FIG. 18

(a) CG INSIDE: TABLE 1, INTER CG: TABLE 2

| 1  | 3  | 9  | 11 | 25 | 27 | 41 | 43 |
|----|----|----|----|----|----|----|----|
| 2  | 5  | 10 | 13 | 26 | 29 | 42 | 45 |
| 4  | 7  | 12 | 15 | 28 | 31 | 44 | 47 |
| 6  | 8  | 14 | 16 | 30 | 32 | 46 | 48 |
| 17 | 19 | 33 | 35 | 49 | 51 | 57 | 59 |
| 18 | 21 | 34 | 37 | 50 | 53 | 58 | 61 |
| 20 | 23 | 36 | 39 | 52 | 55 | 60 | 63 |
| 22 | 24 | 38 | 40 | 54 | 56 | 62 | 64 |

(b) CG INSIDE: TABLE 2, INTER CG: TABLE 2

| 1  | 2  | 4  | 6  | 25 | 26 | 28 | 30 |
|----|----|----|----|----|----|----|----|
| 3  | 5  | 7  | 8  | 27 | 29 | 31 | 32 |
| 9  | 10 | 12 | 14 | 41 | 42 | 44 | 46 |
| 11 | 13 | 15 | 16 | 43 | 45 | 47 | 48 |
| 17 | 18 | 20 | 22 | 49 | 50 | 52 | 54 |
| 19 | 21 | 23 | 24 | 51 | 53 | 55 | 56 |
| 33 | 34 | 36 | 38 | 57 | 58 | 60 | 62 |
| 35 | 37 | 39 | 40 | 59 | 61 | 63 | 64 |

(c) CG INSIDE: TABLE 3, INTER CG: TABLE 2

| 1  | 2  | 4  | 6  | 33 | 34 | 36 | 38 |
|----|----|----|----|----|----|----|----|
| 3  | 5  | 7  | 8  | 35 | 37 | 39 | 40 |
| 9  | 10 | 12 | 14 | 41 | 42 | 44 | 46 |
| 11 | 13 | 15 | 16 | 43 | 45 | 47 | 48 |
| 17 | 18 | 20 | 22 | 49 | 50 | 52 | 54 |
| 19 | 21 | 23 | 24 | 51 | 53 | 55 | 56 |
| 25 | 26 | 28 | 30 | 57 | 58 | 60 | 62 |
| 27 | 29 | 31 | 32 | 59 | 61 | 63 | 64 |

IMAGE ENCODING/DECODING METHOD AND DEVICE THEREFOR

CROSS-REFERENCE TO RELATED APPLICATIONS

This application is a National Stage application under 35 U.S.C. § 371 of International Application No. PCT/KR2018/002952, filed on Mar. 13, 2018, which claims the benefit of U.S. Provisional Application No. 62/484,900, filed on Apr. 13, 2017. The disclosures of the prior applications are incorporated by reference in their entirety.

TECHNICAL FIELD

The present disclosure relates to a still image or a moving image processing method, and more particularly, to a method for encoding/decoding a transformed residual signal and a device for supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An object of the present disclosure proposes a method for encoding/decoding a transformed residual signal.

Further, an object of the present disclosure proposes a method for configuring a scan order among split coefficient groups from a transform block in order to perform entropy coding for a residual signal.

Further, an object of the present disclosure proposes a method for configuring a scan order in coefficients in split coefficient groups from a transform block in order to perform entropy coding for a residual signal.

The technical objects of the present disclosure are not limited to the aforementioned technical objects, and other technical objects, which are not mentioned above, will be apparently appreciated by a person having ordinary skill in the art from the following description.

Technical Solution

In an aspect of the present disclosure, an image encoding method may include: generating a quantized transform block by performing transform and quantization on a residual signal of a current block; splitting the quantized transform block into a plurality of coefficient groups; determining a first scan order representing the scan order among the coefficients of the coefficient groups; and entropy encoding the coefficients of the quantized transform block according to the first scan order, and a second scan order representing the scan order among the plurality of coefficient groups.

Preferably, the determining of the first scan order may include determining a distance value among respective coefficients of the coefficient group based on a left upper coefficient of the coefficient group, and allocating a scan index to coefficients having the same distance value according to a predetermined order while sequentially increasing the distance value.

Preferably, the determining of the distance value among the respective coefficients of the coefficient group may include determining, when the coefficient group is a non-square block, a horizontal increment representing an increase amount of a coordinate value in a horizontal direction of each coefficient and a vertical increment representing an increase amount of the coordinate value in a vertical direction based on a ratio of a width and a height of the coefficient group, and a distance value of the respective coefficients may be determined by a value acquired by summing up the horizontal increment and the vertical increment.

Preferably, when the width of the coefficient group is larger than the height, the horizontal increment may be determined as 1 and the vertical increment may be determined as 2, and when the height of the coefficient group is larger than the width, the horizontal increment may be determined as 2 and the vertical increment may be determined as 1.

Preferably, the splitting of the quantized transform block into the plurality of coefficient groups may include hierarchically splitting the quantized transform block and splitting the split quantized transform blocks into coefficient groups having a lower depth, and the second scan order may include a scan order among coefficient groups having respective depths from the quantized transform block.

Preferably, when the quantized transform block is the non-square block, the quantized transform block may be split into coefficient groups constituted by a specific number of coefficients, and the specific number may be determined according to a ratio of a width and a height of the quantized transform block.

In another aspect of the present disclosure, a method for decoding an image may include: splitting a current processing block into a plurality of coefficient groups; determining a first scan order representing the scan order among the coefficients of the coefficient groups; entropy decoding a bitstream output from an encoder to generate a quantized transform coefficient; and arranging the coefficients of the quantized transform block according to the first scan order and the second scan order representing the scan order among the plurality of coefficient groups to generate the quantized transform block of the current processing block.

In another aspect of the present disclosure, the determining of the first scan order may include determining a distance value among respective coefficients of the coefficient group based on a left upper coefficient of the coefficient group, and allocating a scan index to coefficients having the same distance value according to a predetermined order while sequentially increasing the distance value.

Preferably, the determining of the distance value among the respective coefficients of the coefficient group may include determining, when the coefficient group is a non-square block, a horizontal increment representing an increase amount of a coordinate value in a horizontal direction of each coefficient and a vertical increment representing an increase amount of the coordinate value in a vertical direction based on a ratio of a width and a height of the coefficient group, and a distance value of the respective coefficients may be determined by a value acquired by summing up the horizontal increment and the vertical increment.

Preferably, when the width of the coefficient group is larger than the height, the horizontal increment may be determined as 1 and the vertical increment may be determined as 2, and when the height of the coefficient group is larger than the width, the horizontal increment may be determined as 2 and the vertical increment may be determined as 1.

Preferably, the splitting of the current processing block into the plurality of coefficient groups may include hierarchically splitting the current processing block and splitting the split current processing block into coefficient groups having a lower depth, and the second scan order may include a scan order among coefficient groups having respective depths from the current processing block.

Preferably, when the current processing block is the non-square block, the current processing block may be split into coefficient groups constituted by a specific number of coefficients, and the specific number may be determined according to a ratio of a width and a height of the current processing block.

In yet another aspect of the present disclosure, a device for decoding an image may include: a coefficient group splitting unit splitting a current processing block into a plurality of coefficient groups; a scan order determining unit determining a first scan order representing the scan order among the coefficients of the coefficient groups; a transform coefficient generating unit entropy decoding a bitstream output from an encoder to generate a quantized transform coefficient; and a transform block generating unit arranging the coefficients of the quantized transform block according to the first scan order and the second scan order representing the scan order among the plurality of coefficient groups to generate the quantized transform block of the current processing block.

Advantageous Effects

According to an embodiment of the present disclosure, the amount of a residual signal can be saved at the time of encoding s till image or a moving image.

Further, according to an embodiment of the present disclosure, the amount of the residual signal is saved to enhance encoding/decoding efficiency.

Further, according to an embodiment of the present disclosure, a scan order of transform coefficients is efficiently configured to reduce a data amount required for coding the transform coefficient.

Further, according to an embodiment of the present disclosure, the scan order of the transform coefficients is configured by considering a non-square block shape to reduce the data amount required for coding the transform coefficient and enhance compression performance.

Advantages which can be obtained in the present disclosure are not limited to the aforementioned effects and other unmentioned advantages will be clearly understood by those skilled in the art from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 7 is a diagram illustrating a method for scanning transform coefficients in units of a coefficient group as an embodiment to which the present disclosure is applied.

FIGS. 14 and 15 are diagrams for describing a method for determining a scan order for coefficients of a non-square block as an embodiment to which the present disclosure is applied.

FIGS. 16 and 17 are diagrams for describing a method for determining a scan order for coefficients of a non-square block in units of a super-pixel as an embodiment to which the present disclosure is applied.

FIG. 18 is a diagram illustrating a method for determining a scan order for coefficient groups as an embodiment to which the present disclosure is applied.

MODE FOR INVENTION

Figure 1:
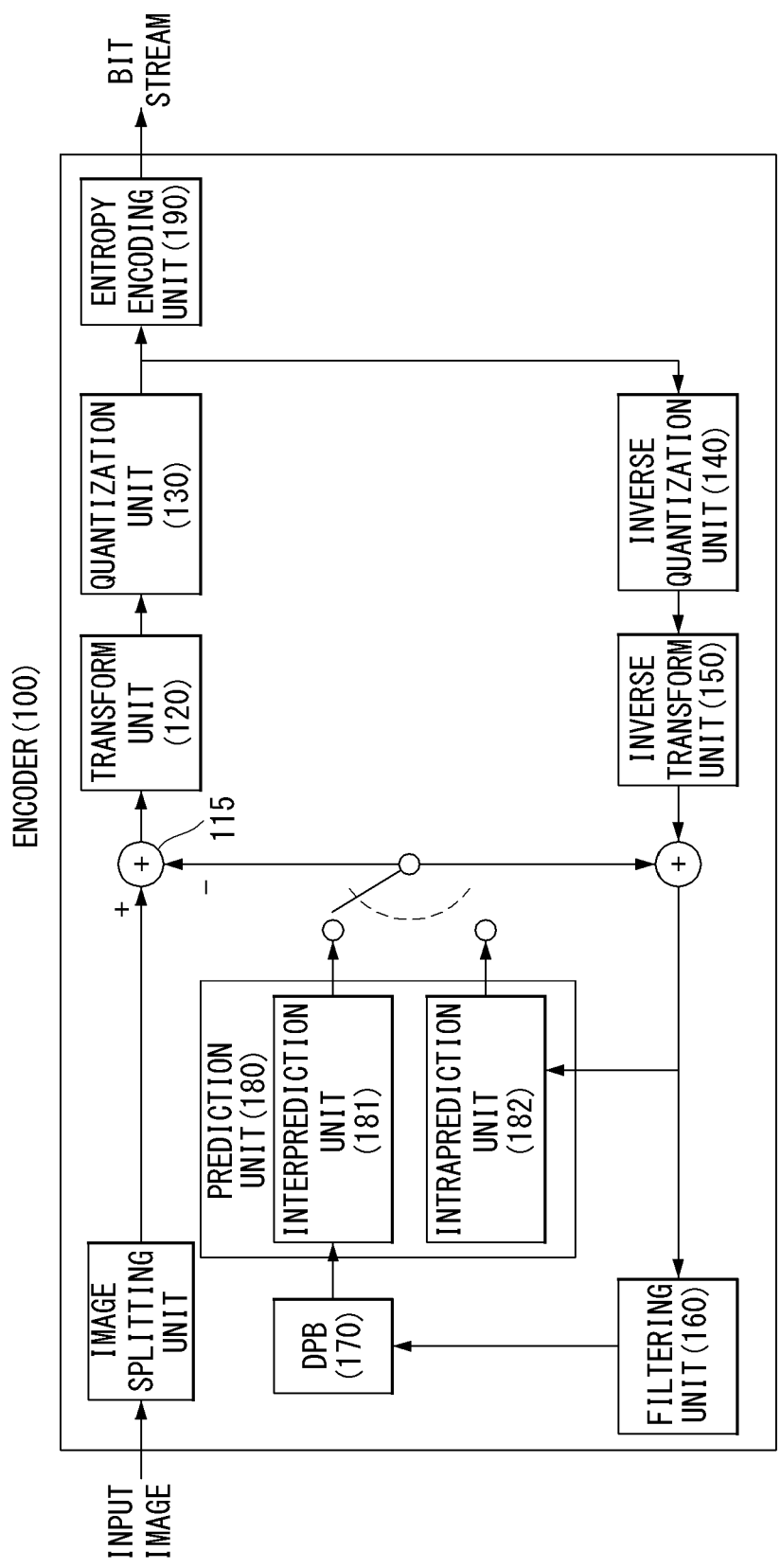
FIG. 1 is illustrates a schematic block diagram of an encoder in which the encoding of a still image or video signal is performed, as an embodiment to which the present disclosure is applied.

Hereinafter, a preferred embodiment of the present disclosure will be described by reference to the accompanying drawings. The description that will be described below with the accompanying drawings is to describe exemplary embodiments of the present disclosure, and is not intended to describe the only embodiment in which the present disclosure may be implemented. The description below includes particular details in order to provide perfect understanding of the present disclosure. However, it is understood that the present disclosure may be embodied without the particular details to those skilled in the art.

In some cases, in order to prevent the technical concept of the present disclosure from being unclear, structures or devices which are publicly known may be omitted, or may be depicted as a block diagram centering on the core functions of the structures or the devices.

Further, although general terms widely used currently are selected as the terms in the present disclosure as much as possible, a term that is arbitrarily selected by the applicant is used in a specific case. Since the meaning of the term will be clearly described in the corresponding part of the description in such a case, it is understood that the present disclosure will not be simply interpreted by the terms only used in the description of the present disclosure, but the meaning of the terms should be figured out.

Specific terminologies used in the description below may be provided to help the understanding of the present disclosure. Furthermore, the specific terminology may be modified into other forms within the scope of the technical concept of the present disclosure. For example, a signal, data, a sample, a picture, a frame, a block, etc. may be properly replaced and interpreted in each coding process.

Hereinafter, in present disclosure, a 'block' or 'unit' may mean a unit in which a process of encoding/decoding such as prediction, transform, and/or quantization is performed and may be configured in a multi-dimensional array of a sample (or a pixel).

The 'block' or 'unit' may mean a multi-dimensional array of the sample for a luma component and may mean a multi-dimensional array of the sample for a chroma component. Further, the block or unit may be collectively referred to as both the multi-dimensional array of the sample for the luma component and the multi-dimensional array of the sample for the chroma component.

For example, the 'block' or 'unit' may be interpreted as a meaning including all of a coding block (CB) meaning an array of samples to be encoded/decoded, a coding tree block (CTB) constituted by a plurality of coding blocks, a prediction block (PB) (or prediction unit (PU)) meaning the array of samples to which the same prediction is applied, and a transform block (TB) (or transform unit (TU)) meaning the array of samples to which the same transform is applied.

Further, unless separately mentioned in present disclosure, the 'block' or 'unit' may be interpreted as a meaning including a syntax structure used during a process of encoding/decoding the array of the samples for the luma component and/or chroma component. Here, the syntax structure means a syntax element on 0 or more syntax elements which exist in a bitstream in a specific order and the syntax element means an element of data represented in the bitstream.

For example, the 'block' or 'unit' may be interpreted as a meaning including all of a coding unit (CU) including the coding block (CB) and the syntax structure used for encoding the coding block (CB), a coding tree unit (CU) constituted by a plurality of coding units, a prediction unit (PU) including the prediction block (PB) and a syntax structure used for predicting the prediction block (PB), and a transform unit (TU) including the transform block (TB) and a syntax structure used for transforming the transform block (TB).

Further, in present disclosure, the 'block' or 'unit' is not particularly limited to an array of square or rectangular samples (pixels) and may mean an array of polygonal samples (or pixels) having three or more vertices. In this case, the 'block' or 'unit' may be referred to as a polygon block or a polygonal unit.

FIG. 1 is illustrates a schematic block diagram of an encoder in which the encoding of a still image or video signal is performed, as an embodiment to which the present disclosure is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more blocks.

The subtractor 115 generates a residual signal (or residual block) by subtracting a predicted signal (or predicted block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal (or reconstructed block) may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Here, since the reference picture used for performing prediction is a signal encoded/decoded in units of a block at a previous time, blocking artifacts or ringing artifacts may exist.

Accordingly, the inter-prediction unit 181 may interpolate a signal between pixels in units of a sub-pixel by applying a low-pass filter in order to solve performance degradation due to discontinuity or quantization of such a signal or enhance prediction of motion prediction. Here, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 181 applies the interpolation filter to the integer pixel to generate an interpolated pixel and the prediction may be performed by using an interpolated block constituted by the interpolated pixels.

The intra-prediction unit 182 predicts the current block by referring to samples in the vicinity of a block which is to be subjected to current encoding. The intra-prediction unit 182 may perform the following process in order to perform the intra prediction. First, a reference sample may be prepared, which is required for generating the prediction signal. In addition, the predicted signal (predicted block) may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The predicted signal (or predicted block) generated through the inter-prediction unit 181 or the intra-prediction unit 182 may be used for generating the reconstructed signal (or reconstructed block) or used for generating the residual signal (or residual block).

Figure 2:
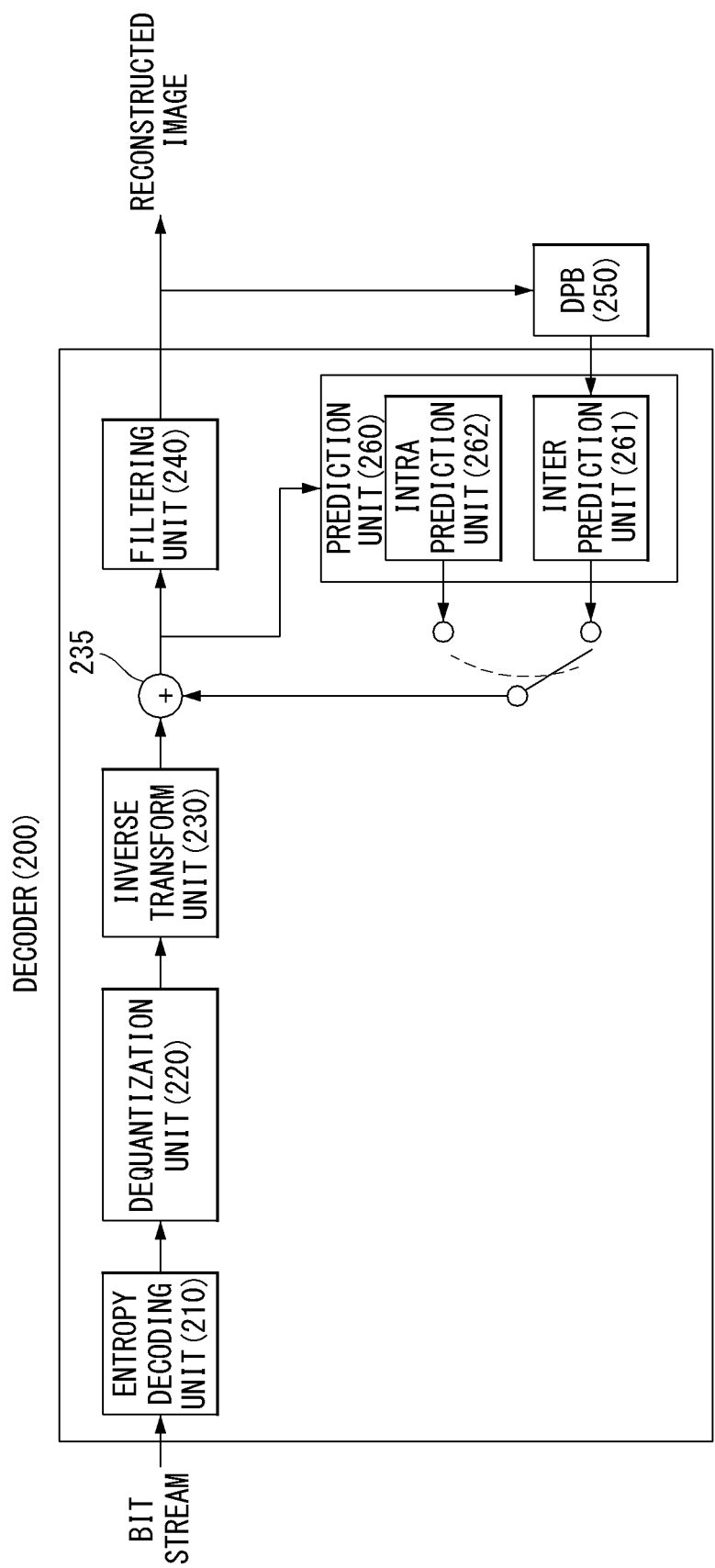
FIG. 2 illustrates a schematic block diagram of a decoder in which decoding of a still image or video signal is performed, as an embodiment to which the present disclosure is applied.

FIG. 2 illustrates a schematic block diagram of a decoder in which decoding of a still image or video signal is performed, as an embodiment to which the present disclosure is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the acquired residual signal (or residual block) to the predicted signal (or predicted block) output from the prediction unit 260 (i.e., the inter-prediction unit 261 or the intra-prediction unit 262) to generate the reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In present disclosure, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Block Split Structure

In general, a block-based image compression method is used in the compression technique (e.g., HEVC) of a still image or a video. The block-based image compression method is a method of processing an image by splitting it into specific block units, and may decrease memory use and a computational load.

Figure 3:
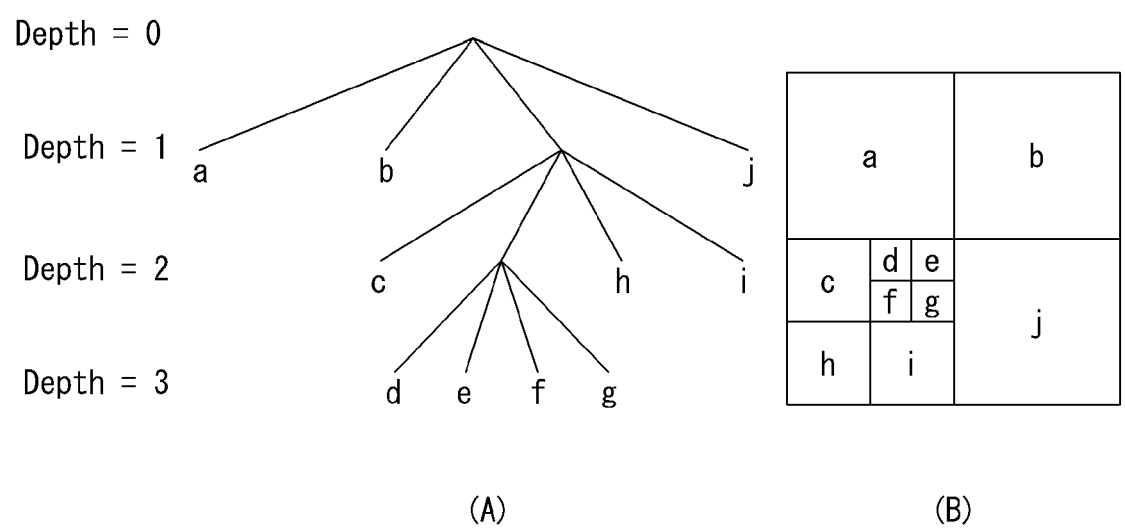
FIG. 3 is a diagram for describing a split structure of a coding unit that may be applied to the present disclosure.

FIG. 3 is a diagram for describing a split structure of a coding unit which may be applied to the present disclosure.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding, tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(*b*), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

Figure 4:
FIG. 4 is a diagram for describing a prediction unit that may be applied to the present disclosure.
Figure 4:
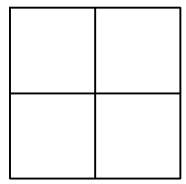
Figure 4:
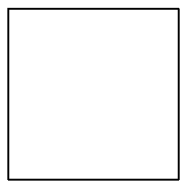
Figure 4:
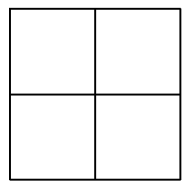
Figure 4:
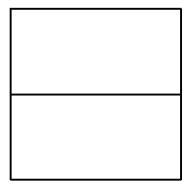
Figure 4:
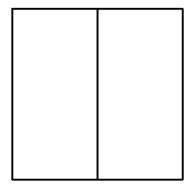
Figure 4:
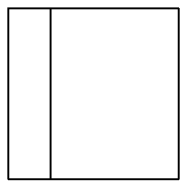
Figure 4:
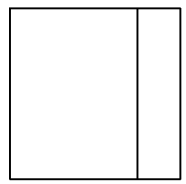
Figure 4:
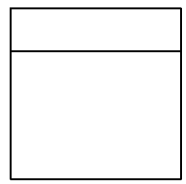
Figure 4:
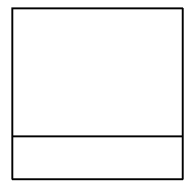

FIG. 4 is a diagram for describing a prediction unit that may be applied to the present disclosure.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") representing whether a corresponding TU has been split with respect to one TU may be transferred to the decoder. The split information is included in all of TUs other than a TU of a minimum size. For example, if the value of the flag representing whether a TU has been split is "1", the corresponding TU is split into four TUs. If the value of the flag representing whether a TU has been split is "0", the corresponding TU is no longer split.

Encoding/Decoding Method of Residual Signal

An input image is differentiated by the block predicted by the intra-prediction unit or the inter-prediction unit and information related to prediction and a residual signal for differentiation are transmitted to reconstruct the image in a decoder. This will be described in more detail with reference to drawings given below.

Figure 5:
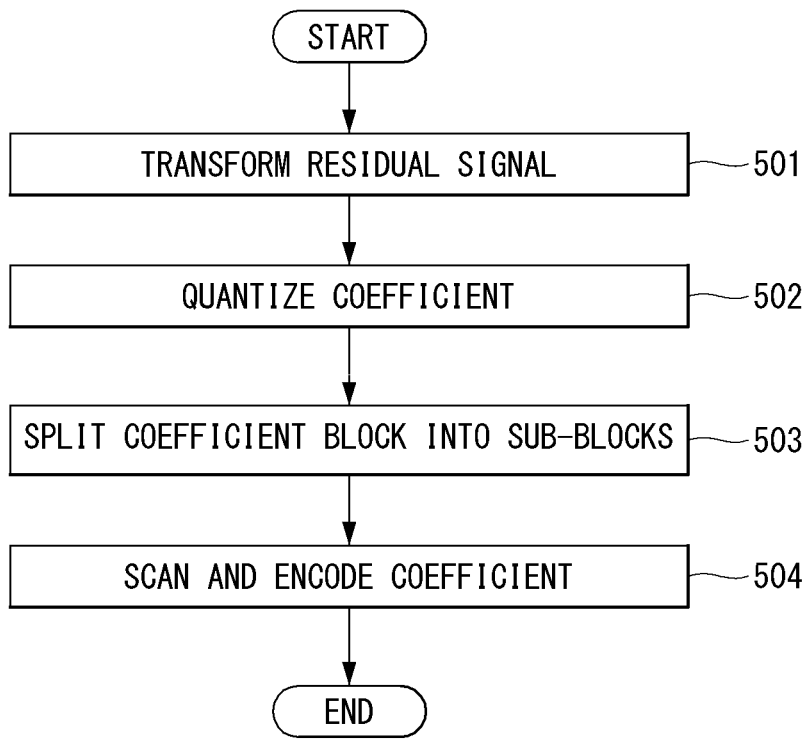
FIG. 5 illustrates a method for encoding a residual signal as an embodiment to which the present disclosure is applied.

FIG. 5 illustrates a method for encoding a residual signal as an embodiment to which the present disclosure is applied.

Referring to FIG. 5, an encoder (encoding device) transforms a residual signal (or residual block) (S501). The residual signal means a signal differentiated from the signal predicted by the intra-prediction unit or the inter-prediction unit from the input image. The residual signal is a signal of a spatial domain and is transformed to the frequency domain to remove a correlation between the signals and concentrate energy on a low-frequency region. In this case, the encoder may generate the transform coefficient by applying a transform technique such as DCT, DST, GBT, KLT, etc.

The encoder quantizes the transform coefficient (S502). The transformed signal is scaled and/or quantized in order to reduce a magnitude of the signal.

The encoder divides the transform block into subblocks (S503). The encoder may divide the transform block into subblocks (e.g., a subblock having a 4×4 size) having a predetermined constant size.

The encoder scans the quantized transform coefficient and encodes the coefficient according to a scan order (S504). That is, the quantized transform coefficients are entropy-encoded and transmitted to the decoder according to a predetermined order.

Here, the scan order may correspond to an up-right diagonal scan order, a horizontal scan order, a vertical scan order, etc.

The encoder may scan transform coefficients in a reverse direction until reaching a coefficient of coordinate (0,0) so called DC coefficient by starting at a location of a last significant coefficient (i.e., a last non-zero coefficient). In this case, the quantized transform coefficients in each sub-block may be scanned according to the up-right diagonal scan order and further, respective subblocks may also be scanned according to the up-right diagonal scan order similarly.

In this case, information for identifying a location (i.e., a location of a column and a location of a row) of the last significant coefficient in the transform block may be encoded.

The decoder may acquire the reconstructed image by reversely performing the process in the encoder. This will be described in more detail with reference to drawings given below.

Figure 6:
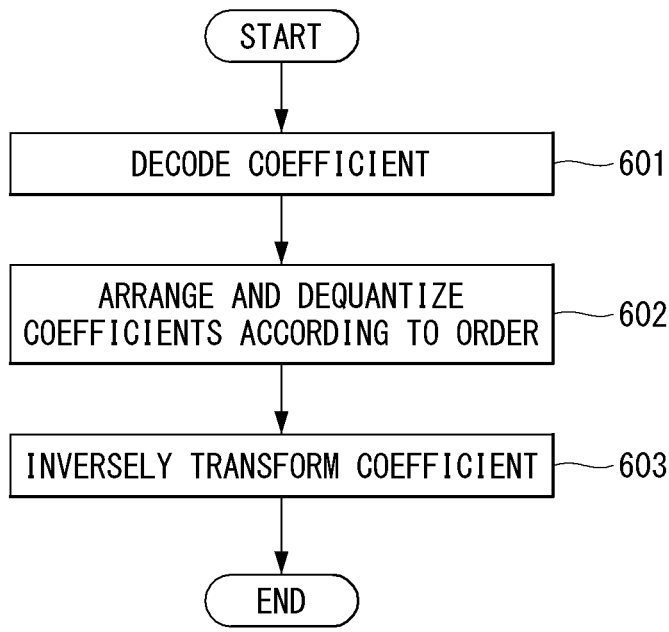
FIG. 6 illustrates a method for decoding a residual signal as an embodiment to which the present disclosure is applied.

FIG. 6 illustrates a method for decoding a residual signal as an embodiment to which the present disclosure is applied.

Referring to FIG. 6, the decoder (decoding device) decodes a coefficient (S601). That is, the decoder performs entropy decoding for a signal (i.e., bitstream) output from the encoder to acquire a quantized transform coefficient.

The decoder locates the quantized transform coefficients in the scan order and inversely quantizes the transform coefficients (S602). That is, the decoder may arrange respective quantized transform coefficients reconstructed through entropy decoding in the residual signal array according to a predetermined order.

As described above, the scan order may correspond to the up-right diagonal scan order, the horizontal scan order, the vertical scan order, etc.

As described above, information representing the location of the last significant coefficient (i.e., non-zero coefficient) according to the scan order in the transform block may be signaled through the bitstream. The decoder parses the above information to derive the location of the column and the location of the row of the last significant coefficient (i.e., non-zero coefficient) according to the scan order in the transform block.

The decoder may scan transform coefficients in the reverse direction until reaching coordinate (0,0) so called DC coefficient by starting at the location of the last significant coefficient (i.e., non-zero coefficient). In this case, the quantized transform coefficients in each subblock may be scanned according to a reverse order to the up-right diagonal scan order and further, respective subblocks may also be scanned according to the reverse order to the up-right diagonal scan order similarly.

The decoder may inversely quantize the quantized transform coefficients according to the scan order as described above.

The decoder inversely transforms the inversely quantized transform coefficients (S603). That is, the decoder may inversely transform the transform coefficient by applying an inverse transform technique and acquire the residual signal.

As such, respective coefficients reconstructed through entropy decoding may be arranged in the residual signal array according to the scan order and reconstructed into the residual signals of the spatial domain through inverse quantization and inverse transform. In addition, the reconstructed residual signal is combined with the prediction signal and then output as the reconstructed image through a filtering process.

Embodiment 1

In an embodiment of the present disclosure, the encoder/decoder may hierarchically configure the scan order for the transform coefficients. In other words, the encoder/decoder may split the transform block (or residual block or scan processing block) into coefficient groups and then perform scanning in units of the split coefficient groups. The coefficient group may be referred to as a subblock, a sub group, a sub coefficient group, etc.

The encoder/decoder may scan the transform coefficient in each coefficient group while scanning the transform coefficient in units of the coefficient group split from the transform block according to the scan order. For example, the coefficient group may be a block having a 4×4 size. This will be described with reference to FIG. 7 below.

FIG. 7 is a diagram illustrating a method for scanning transform coefficients in units of a coefficient group as an embodiment to which the present disclosure is applied.

Referring to FIG. 7, it is assumed that the size of the current block (i.e., transform block) is 8×8 and the coefficient group is determined as 4×4 blocks. In this case, for example, the encoder/decoder may scan the coefficient groups in the order of CG1 701, CG3 703, CG2 702, and CG4 704. In addition, the encoder/decoder may scan the coefficients in each coefficient group according to a diagonal scan order similarly to the scan order between the coefficient groups.

When the current block having the 8×8 size of FIG. 7 is expressed as $CG^0$ (1) and the coefficient groups having the 4×4 size are expressed as $CG^1(1, k)$, k=1, ..., 4 (where k represents the scan order), the coefficient groups of FIG. 7 may satisfy Equation 1 below.

$$CG^1(1,1)=CG1, CG^1(1,2)=CG3, CG^1(1,3)=CG2, CG^1(1,4)=CG4 \quad \text{[Equation 1]}$$

It is assumed that scanning starts from a coefficient (i.e., DC coefficient) corresponding to a low frequency in FIG. 7 and Equation 1, but encoding/decoding may be performed from a coefficient group scanned last in an actual encoding/decoding process. Further, in this case, the coefficients in the coefficient group may be scanned by using the same scan order and encoding/decoding may be performed from the coefficient positioned last in the scan order.

That is, when entropy coding for the transform coefficient is performed, the coefficient groups may be encoded in the order of CG4 704, CG2 702, CG3 703, and CG1 701 and in this case, a DC component coefficient positioned at an upper left end may be encoded last.

In present disclosure, embodiments are described based on a method for first scanning the DC component at the upper left end as in Equation 1, but the present disclosure is not limited thereto and a reverse-direction scan order may be applied. Even when the reverse scan order is applied during the actual coding process, the method proposed by the present disclosure may be applied. In this case, the reverse scan order may be derived by using Equation 9 to be described below from a forward scan order.

Figure 8:
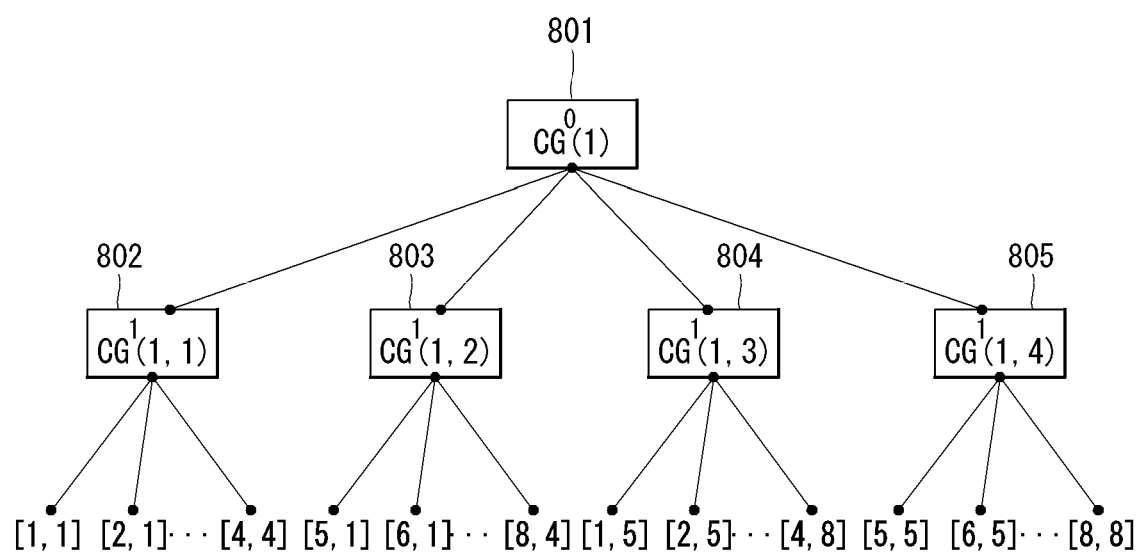
FIG. 8 is a diagram illustrating a scan order of transform coefficients for each coefficient group as an embodiment to which the present disclosure is applied.

FIG. 8 is a diagram illustrating a scan order of transform coefficients for each coefficient group as an embodiment to which the present disclosure is applied.

Referring to FIG. 8, a hierarchical relationship of a current block 801, coefficient groups 802, 803, 804, and 805, and coefficients in each coefficient group may be represented as a tree structure. In this case, the encoder/decoder may perform scanning in the order from the left side to the right side and perform scanning according to a depth-first search method.

Leaf nodes having the tree structure represent locations of coefficients in the current block 801. The location of each coefficient may be represented as a 1×2 row vector constituted by a row-direction index and a column-direction index.

In present disclosure, the coefficient group may be written as $CG^d(i_0, i_1, \ldots, i_d)$. Here, $i_k$ (k=0, 1, ..., d) represents a scan index ink depth of the corresponding coefficient group. In addition, d represents the depth of the corresponding coefficient group in the tree structure.

Figure 9:
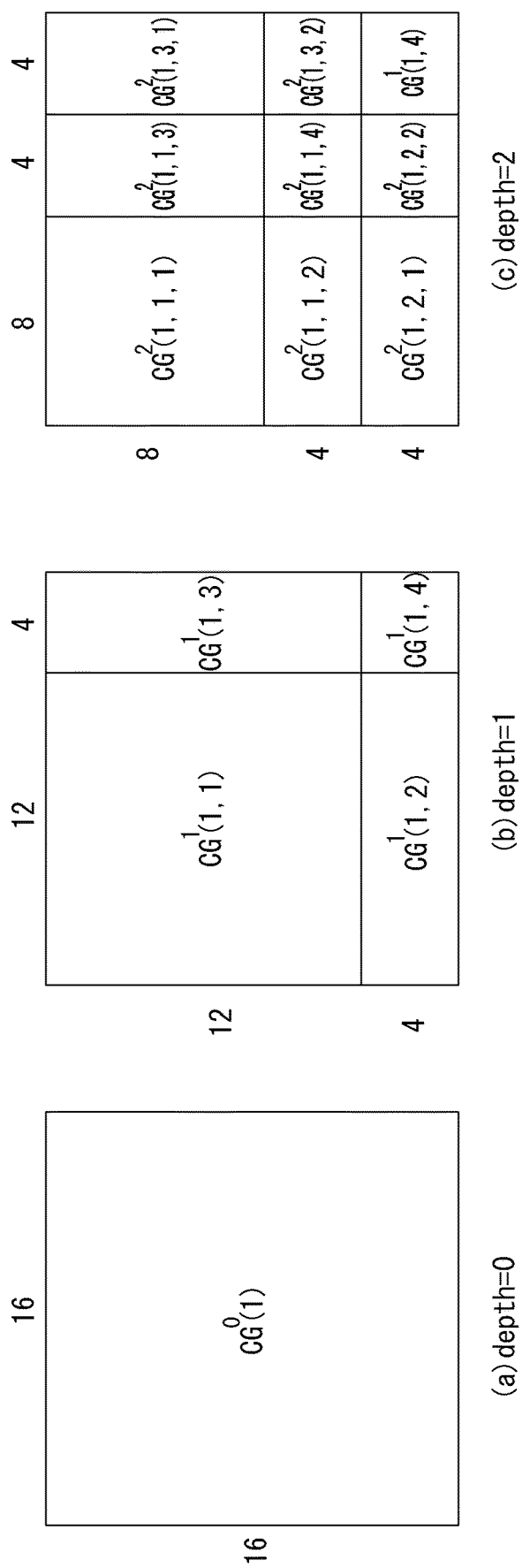
FIGS. 9 and 10 are diagrams for describing a method for determining a split structure of a transform block and a scan order of a transform coefficient as an embodiment to which the present disclosure is applied.
Figure 10:
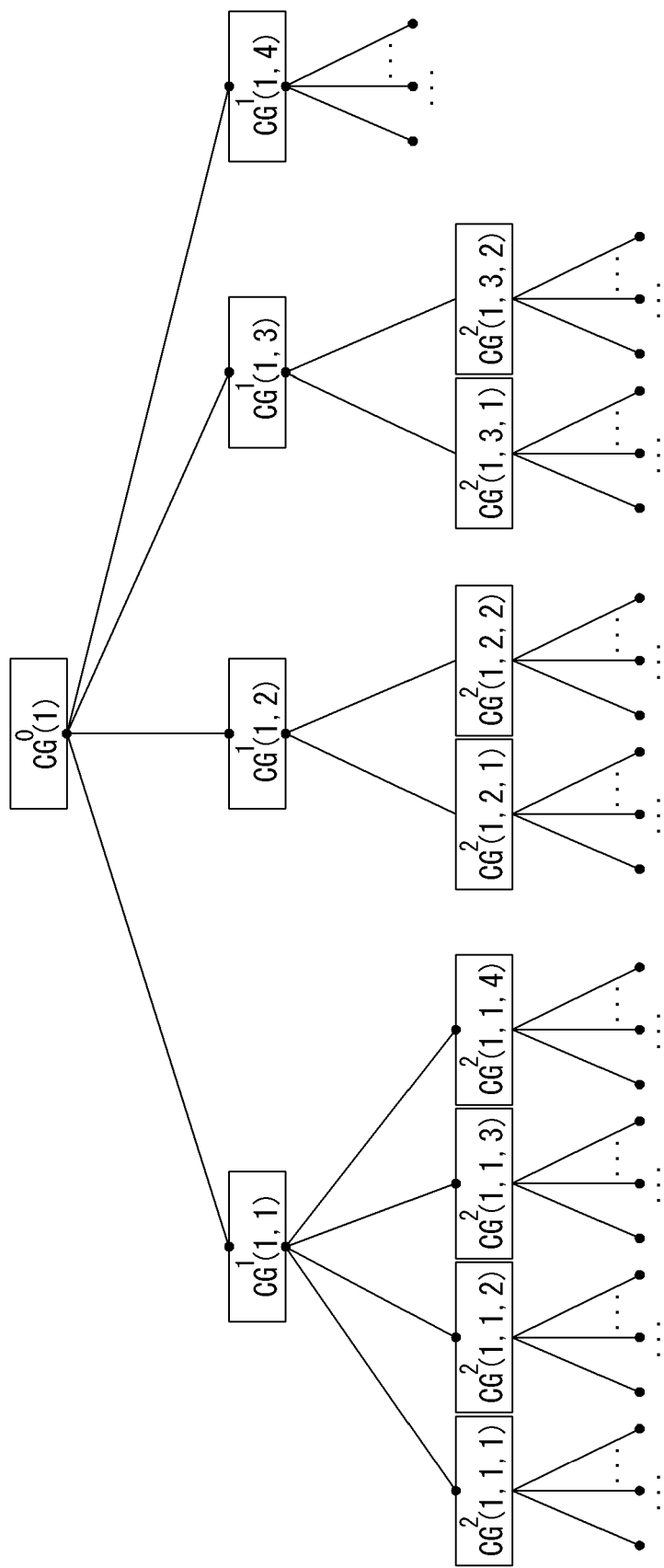

FIGS. 9 and 10 are diagrams for describing a method for determining a split structure of a transform block and a scan order of a transform coefficient as an embodiment to which the present disclosure is applied.

Referring to FIG. 9, it is assumed that a current processing block is a block having a 16×16 size. In this case, the encoder/decoder may recursively (or hierarchically) split (i.e., split the current processing block into depth 2 or more) the current processing block in order to perform scanning of the transform coefficient. When the current processing block is recursively split as shown in FIG. 9(c), the split structure of the current processing block may be represented in a tree form illustrated in FIG. 14.

Referring to FIG. 10, the lead nodes having the tree structure are scanned from the left side to the right side to perform scanning for all transform coefficients. That is, the scan order may be determined from the left side to the right side of the leaf node having the tree structure.

In present disclosure, a leaf coefficient group represents a lowest depth coefficient group (i.e., a coefficient group of depth 2 in FIG. 10) including the lead node (i.e., the transform coefficient in the coefficient group) having the tree structure in FIG. 10. The leaf coefficient group is not split into coefficient groups having lower depths any longer. Further, in a block structure which is split into a tree structure, as the number of splitting times increases, the depth increases. A node having a lower depth represents nodes which are split from a node in which a depth value is relatively larger, i.e., a node having a higher depth.

The scan order $CG^d$ ($i_0$, $i_1$, . . . , $i_d$) may be expressed as shown in Equation 2 below.

$$\tau(CG^d(i_0, i_1, \ldots, i_d)) = \begin{bmatrix} r_1 & c_1 \\ r_2 & c_2 \\ \vdots & \vdots \\ r_{h \times w} & c_{h \times w} \end{bmatrix},$$ [Equation 2]

where h=height of $CG^d$ ($i_0$, $i_1$, . . . , $i_d$) and w=width of $CG^d$ ($i_0$, $i_1$, . . . , $i_d$)

Referring to FIG. 2, each row vector [$r_i$ $c_i$](i=1, . . . , h×w) represents the location of the transform coefficient in h×w blocks. $r_i$ represents a row index and $c_i$ represents a column index (1≤$r_i$≤h, 1≤$c_i$≤w).

In present disclosure, it is assumed that row indexes and column indexes of all 2D blocks start from 1. In Equation 2, $\tau(CG^d$ ($i_0$, $i_1$, . . . , $i_d$)) represents the scan order of the coefficients in the corresponding coefficient group. That is, the coefficients at the corresponding locations may be scanned in an order from [$r_1$ $c_1$] to [$r_{h \times w}$ $c_{h \times w}$].

As described above, since each of row vectors constituting $\tau(CG^d$ ($i_0$, $i_1$, . . . , $i_d$)) of Equation 2 represents the location of the transform coefficient in blocks having an h×w size, a row index offset and a column index offset in the transform block (i.e., $CG^0$ (1)) for the coefficient group $CG^d$ ($i_0$, $i_1$, . . . , $i_d$) having the depth d are added to all column vectors constituting $\tau(CG^d$ ($i_0$, $i_1$, . . . , $i_d$) to acquire the scan order in the transform block. In this case, the row index offset and the column index offset may be calculated by using Equation 3 below.

$$V(CG^{d+1}(i_0, i_1, \ldots, i_{d+1})) = V(CG^d(i_0, i_1, \ldots, i_d)) + $$ [Equation 3]
$$V^{rel}(CG^{d+1}(i_0, i_1, \ldots, i_{d+1}))$$
$$= \sum_{k=1}^{d+1} V^{rel}(CG^k(i_0, i_1, \ldots, i_k))$$

Referring to Equation 3, $V^{rel}$ ($CG^{d+1}$($i_0$, $i_1$, . . . , $i_{d+1}$)) represents a column vector representing a relative location of $CG^d$ ($i_0$, $i_1$, . . . , $i_d$) of the current transform block. For example, in FIG. 9 above, $V^{rel}(CG^2(1,1,4))$=[8 8] may be established and $V(CG^2(1,2,2))$=$V(CG^1(1,2))$+$V^{rel}(CG^2(1,2,2))$=[12 0]+[0 8]=[12 8] may be established.

When vector 1 is defined as 1=[1 1 . . . 1]$^T$, the scan order of $CG^d$ ($i_0$, $i_1$, . . . , $i_d$) may be calculated by using Equation 4 below.

$$S(CG^d(i_0,i_1,\ldots,i_d))=\tau(CG^d(i_0,i_1,\ldots,i_d))+1 \cdot V(CG^d(i_0,i_1,\ldots,i_d))$$ [Equation 4]

When $CG^d$ ($i_0$, $i_1$, . . . , $i_d$) is the leaf coefficient group, the scan order in all blocks (i.e., transform blocks) may be calculated by using Equation 4 above. That is, the scan order in all blocks is equal to a sum of the scan order in the coefficient group calculated by using Equation 2 described above and the offset (i.e., 1·V($CG^d$($i_0$, $i_1$, . . . , $i_d$))) of the coefficient group calculated by using Equation 3 described above.

When $CG^d$ ($i_0$, $i_1$, . . . , $i_d$) is not the leaf coefficient group, the scan order in the transform block may be calculated by using Equation 5 below.

$$S(CG^d(i_0, i_1, \ldots, i_d)) = \begin{bmatrix} S(CG^{d+1}(i_0, i_1, \ldots, i_d, 1)) \\ S(CG^{d+1}(i_0, i_1, \ldots, i_d, 2)) \\ \vdots \\ S(CG^{d+1}(i_0, i_1, \ldots, i_d, N)) \end{bmatrix},$$ [Equation 5]

where N=number of CGs in $CG^d$ ($i_0$, $i_1$, . . . , $i_d$) and d≥0

The scan order for all blocks $CG^0$ (1) may be expressed as S($CG^0$ ($i_0$)). In this case, the row index of the S($CG^0$ ($i_0$)) may represent the scan index and each row vector of the S($CG^0$ ($i_0$)) may represent the location in all blocks for the corresponding scan index.

Figures 11, 12:
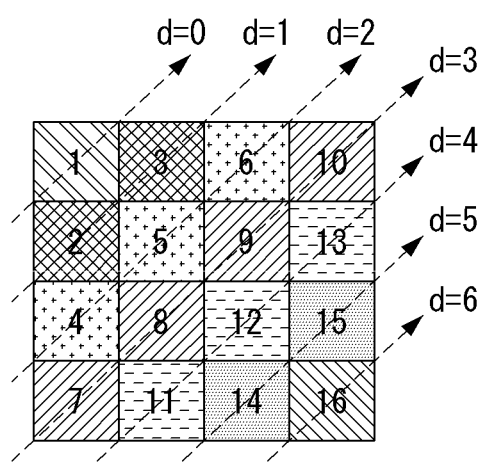
FIG. 11 is a diagram illustrating one example of representing a location of a coefficient in a block as an embodiment to which the present disclosure is applied.
FIGS. 12 and 13 are diagrams illustrating a scan order depending on a location of a transform coefficient in a block according to an embodiment of the present disclosure.

FIG. 11 is a diagram illustrating one example of representing a location of a coefficient in a block as an embodiment to which the present disclosure is applied.

Referring to FIG. 11, the location of the coefficient in the block may be represented by using a raster scan order (i.e., a row-first order and a lexicographical order). Index values may be allocated to the locations of the respective coefficients according to the scan order as illustrated in FIG. 11. In addition, the index values representing the location of the coefficient of FIG. 11 may be expressed as shown in Equation 6 below.

$$\hat{S}(CG^d(i_0, i_1, \ldots, i_d)) = S(CG^d(i_0, i_1, \ldots, i_d)) \cdot \begin{bmatrix} w \\ 1 \end{bmatrix},$$ [Equation 6]

where $w$ = width of $CG^0(i_0)$ and $d \geq 0$

When an index representing the location of the coefficient is assigned according to a random scan order including the raster scan order described above in the locations of the transform coefficients in the block, the scan order may be expressed as shown in Equation 7 below.

$$S(CG^d(i_0,i_1,\ldots,i_d))=f(S(CG^d(i_0,i_1,\ldots,i_d))), \text{where}$$
$$f:R^{L \times 2} \to R^L,$$ [Equation 7]

$L = (\text{height of } CG^0(i_0)) \times (\text{width of } CG^0(i_0))$

When J(X)=X·⌊1⌋, X∈K⁻, Equation 7 may be summarized as shown in Equation 6.

The scan order proposed in present disclosure may be described by schemes described in Equations 2 to 7 above. When the scan order is described by the scheme described above as such, the scan order may be determined by the following components.

1) Recursive splitting of coefficient group in each depth (i.e., a depth of 0 or more)
2) Determining scan order for split coefficient groups
3) Determining scan order for transform coefficients of leaf coefficient group When the components are determined, the scan order may be determined by using Equations 2 to 7. Accordingly, the present disclosure proposes a method for configuring an appropriate scan order by determining the components.

A set including all scan order matrixes which are applicable may be expressed as shown in Equation 8 below.

$$N=\{S_1, S_2, \ldots, S_{|N|}\}$$ [Equation 8]

Here, N represents a set in which all scan order matrixes applicable to the blocks are collected. In addition, the block may have various sizes or shapes (e.g., 4×4, 4×8, 16×4, 16×16, 32×8, etc.). In addition, $S(CG^0 (i_0))$ derived by Equation 5 described above may be included as an element of the N.

In an embodiment, the encoder/decoder may select a specific scan order in the N by using information on neighboring blocks of the current processing block and perform scanning by using the selected scan order. The information on the neighboring blocks may be, for example, the number of non-zero coefficients which exist in a left block or an upper block or the location of the last non-zero coefficient. Further, the scan order of the current processing block may be determined by using information on a block coded immediately before the current processing block.

In an embodiment, the encoder/decoder may determine (or apply) the scan order according the size or shape of the current processing block. For example, the encoder/decoder may apply $S_i \in N$ to a block having a 4×8 size and apply $S_j \in N$ (i≠j) to a block having an 8×16 size.

In an embodiment, the encoder/decoder may select and apply a specific scan order among sets (i.e., a subset of) of scan orders applicable to a block having a specific size or shape. In this case, the encoder may signal to the decoder an index for a scan order selected in units of a sequence, a picture, a slice, a CTU, a coding block, or a transform block (or transform unit).

When the entropy coding is performed with respect to the transform coefficient, the reverse scan order may be applied in addition to the forward scan order. The reverse scan order may be calculated by using Equation 9 below.

[Equation 9]

$$\tau^B(CG^d(i_0, i_1, \ldots, i_d)) = P \cdot \tau(CG^d(i_0, i_1, \ldots, i_d)) =$$

$$\begin{bmatrix} 0 & 0 & \cdots & 1 \\ 0 & \cdots & 1 & 0 \\ \vdots & \ddots & \vdots & \vdots \\ 1 & \cdots & 0 & 0 \end{bmatrix} \cdot \tau(CG^d(i_0, i_1, \ldots, i_d))$$

$$S^B(CG^d(i_0, i_1, \ldots, i_d)) =$$

$$\tau^B(CG^d(i_0, i_1, \ldots, i_d)) + 1 \cdot V(CG^d(i_0, i_1, \ldots, i_d)), \text{ when}$$

$$CG^d(i_0, i_1, \ldots, i_d) = \text{leaf } CG, \text{ otherwise,}$$

$$\lfloor S^B(CG^{d+1}(i_0, i_1, \ldots, i_d, 1)) \rfloor =$$

$$\lfloor 1 \; \ldots \; 0 \; 0 \rfloor \lfloor S(CG^{d+1}(i_0, i_1, \ldots, i_d, N)) \rfloor,$$

where $N$ = number of $CGs$ in $CG^d(i_0, i_1, \ldots, i_d)$ and $d \geq 0$

Here, P represents a permutation matrix in which only an anti-diagonal component has a value of 1. The reverse scan order to the forward scan order may be derived by using the permutation matrix.

Embodiment 2

In an embodiment of the present disclosure, the encoder/decoder may determine the scan order for respective coefficients in the coefficient group based on the size or shape of the coefficient group. That is, the encoder/decoder may determine the scan order of the coefficients in the coefficient group of Equation 2 described above according to the size or shape of the block.

Figure 13:
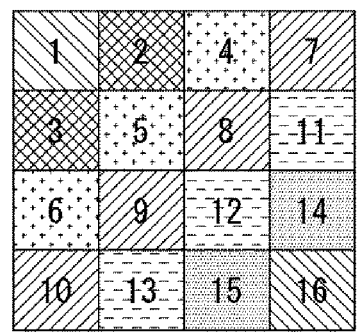

FIGS. 12 and 13 are diagrams illustrating a scan order depending on a location of a transform coefficient in a block according to an embodiment of the present disclosure.

Referring to FIG. 12, the encoder/decoder may scan coefficients in the order in which the d value increases according to the diagonal scan order. Here, the d represents a distance of the corresponding coefficient based on an upper left coefficient. The encoder/decoder may scan coefficients at locations having the same d value from a lower left side to an upper right side.

Here, the d value may be determined as d=dx+dy and as illustrated in FIG. 12(b), dx and dy represent a horizontal increment (or horizontal coordinate) and a vertical increment (or vertical coordinate), respectively.

As described above, the encoder/decoder may apply the reverse scan order to performing the entropy coding for the transform coefficients. In this case, a coefficient in which the d value to a coefficient in which the d value is 0 may be scanned and scanned from the upper right side to the lower left side reversely to an arrow direction illustrated in FIG. 12(a). In present disclosure, the forward scan order is primarily described, but in performing the entropy coding, the encoder/decoder may follow the reverse scan order or the forward scan order.

The location having the same d value may correspond to locations of coefficients having an equal phase in terms of the frequency. Accordingly, the encoder/decoder may assign a random order to coefficients at locations having the same d value. For example, the encoder/decoder may scan line locations in which the d value of FIG. 12(a) is 3 in the order of [4 1], [3 2], [2 3], and [1 4] (each location is expressed by the row vector), [1 4], [2 3], [3 2], and [4 1], or [2 3], [3 2], [1 4], and [4 1].

Further, the encoder/decoder may be configured to scan each anti-diagonal line from the right side to the left side as illustrated in FIG. 13, unlike the example of FIG. 12(a).

Table 1 below shows one example of a pseudo code for determining the diagonal scan order.

TABLE 1

[ scan_order, scan_pos ] = find_scan_order ( height, width )
scan_idx = 1;
for d = 0 : ( ( height − 1 ) + ( width − 1 ) )
sypos = d;
if (sypos ≥ height)
sypos = height - 1;
end
sxpos = d - sypos;
while ( sxpos < width and sypos ≥ 0)
scan_order ( sypos + 1, sxpos + 1 ) = scan_idx;
scan_pos ( scan_idx, : ) = [ ( sypos + 1 ) ( sxpos + 1 ) ];
scan_idx = scan_idx + 1;
sypos = sypos - 1;
sxpos = sxpos + 1;
end
end Referring to Table 1, the encoder/decoder may determine the scan order by allocating the scan index from a coefficient at a lower-leftmost location to a coefficient at an upper rightmost location while increasing the d value by 1 from 0. Here, sypos and sxpos represent parameters representing values acquired by subtracting 1 from the row index and the column index, respectively. That is, it is assumed that sypos and sxpos start from 0.

In Table 1, it is assumed that a diagonal line specified by the d value is scanned from the lower left side, but a code may be configured so as to scan the diagonal line from the upper right side as described in FIG. 13.

In Table 1 above, 'while loop' is to determine a parameter (or matrix) representing the scan information according to the scan order with respect to the diagonal line specified by the d value. The parameter may be a parameter (scan_order) representing the scan order or a parameter (scan_pos) representing the scan position. A scan index allocated to each position (i.e., a component of the scan_order matrix) of the block is stored in the scan_order matrix. In addition, in the scan_pos matrix, each row index corresponds to the scan index and a coefficient position in the block is stored in each row in the form of the row vector.

When the scan order is allocated to the position of the coefficient by the existing method (e.g., HEVC), a horizontal or vertical frequency increase rate may not be effectively reflected when the current processing block is the non-square block.

Specifically, when separable transform is applied to the non-square block, a length of a transform basis vector for a vertical direction and the length of the transform basis vector for a horizontal direction may be different from each other. For example, when the current processing block is a block having a 2N×N size, DCT having a 2N×2N size may be applied to the vertical direction and DCT having an N×N size may be applied to the horizontal direction. In this case, whenever a vertical coordinate of the coefficient increases by 1, the frequency increases by $1/(2N)*\pi$ in a height direction, while whenever a horizontal coordinate of the coefficient increases by 1, the frequency may increase in a width direction.

In describing the method proposed by present disclosure, it is primarily described that an M×N block is a block having a height of M and a width of N, but the present disclosure is not limited thereto and the M×N block may represent a block having the width and the height which are M and N, respectively.

In the case of the non-square block, when the scan order is similarly applied to the position of the coefficient by the existing method, the frequency increase rate may not be effectively reflected in the horizontal direction or the vertical direction. As a result, scanning from a high-frequency component to a low-frequency component may not be normally performed and compression performance of the image may be degraded.

Accordingly, the present disclosure proposes a method for allocating the scan order to the coefficients at respective positions in the non-square block in order to solve such a problem and effectively reflect the frequency increase rate in the horizontal direction or the vertical direction.

The scan order may be acquired by using the methods described in FIG. 12 and Table 1 above even with respect to the non-square block. For example, when the current processing block is the block having the 4×8 size, the height and the width may be configured to 4 and 8, respectively as input parameters of the function and when the function of Table 1 is performed, the corresponding scan order may be acquired.

FIGS. 14 and 15 are diagrams for describing a method for determining a scan order for coefficients of a non-square block as an embodiment to which the present disclosure is applied.

As described above, when the separable transform is applied to the non-square block, the length of the transform basis vector for the vertical direction (i.e., row direction) and the length of the transform basis vector for the horizontal direction (i.e., column direction) may be different from each other.

Referring to FIG. 14, it is assumed that the current processing block is the block having the 4×8 size. In this case, DCT having the 4×4 size may be applied to the vertical direction and DCT having the 8×8 size may be applied to the horizontal direction. When it is assumed that the transform coefficient represents the low-frequency component as the transform coefficient is positioned at the upper left end and represents the high-frequency component as the transform coefficient is positioned at the lower right end, in the case of the 4×8 block of FIG. 14(a), a vertical-direction (or height-direction) frequency increment may be twice larger than the horizontal-direction (or width-direction) frequency increment.

Accordingly, dx and dy depending on the position of the transform coefficient may be configured as illustrated in FIG. 14(b). In addition, the encoder/decoder may configure the scan order in the order in which the d value increases in units of the coefficients of the positions having the same d (in this case, d=dx+dy) value. In the case of the reverse scan order, the encoder/decoder may configure the scan order in the order in which the d value decreases.

In the present disclosure, the scan line may refer to the coefficients at the positions having the same d value. That is, the coefficients having the same d value may be included in the same scan line.

The random scan order may be allocated among the coefficients which belong to the same scan line. When the coefficients are scanned from the left side to the right side, the scan index may be allocated to the coefficients at the respective positions as illustrated in FIG. 14(c).

Referring to FIG. 15, it is assumed that the current processing block is the block having the 8×4 size. Except that the horizontal frequency increment and the vertical frequency increment are different from each other, the encoder/decoder may determine the scan order by configuring the d value by a method which is the same as the aforementioned method.

Table 2 below shows one example of the pseudo code to acquire the scan order by applying the methods described in FIGS. 14 and 15.

TABLE 2

[ scan_order, scan_pos ] = find_scan_order ( height, width )
if ( height ≥ width )
sh = 1;
sw = round ( height / width );
else
sh = round ( width / height );
sw = 1;
end
scan_idx = 1;
for d = 0 : ( ( height − 1 ) · sh + ( width − 1) · sw )
sypos = floor ( d / sh );
if ( sypos ≥ height)
sypos = height - 1;
end
sxpos = d − ( sypos · sh );
rem = sxpos % sw;
if ( rem != 0)
sypos = sypos − ( sw − rem );
sxpos = sxpos + ( sw − rem );
end
sxpos = floor ( sxpos / sw );
while ( sxpos < width and sypos ≥ 0 )
scan_order ( sypos + 1, sxpos + 1 ) = scan_idx;
scan_pos ( scan_idx, : ) = [ ( sypos + 1 ) ( sxpos + 1 ) ];
if ( sh ≥ sw )

TABLE 2-continued

```
sypos = sypos - 1;
sxpos = sxpos + sh;
else
sypos = sypos - sw;
sxpos = sxpos + 1;
end
scan_idx = scan_idx + 1;
end
end
```

Referring to Table 2, sh is a parameter representing the vertical increment (i.e., dy) and sw is a parameter representing the horizontal increment (i.e., dx). Other parameters are the same as those in Table 1 above. In addition, a floor function returns an integer value having a maximum size which is equal to or smaller than a number given as a factor and a round function returns an integer value acquired by rounding off the number given as the factor. The encoder/decoder configures the sh value and the sw value by using a ratio of the width and the height of the current processing block and allocates the scan index to a coefficient at the lower-leftmost position to a coefficient at the upper-rightmost position while increasing the d value by 1 from 0 to determine the scan order.

In an embodiment of the present disclosure, the encoder/decoder may group the coefficients in units of a specific number of coefficients and then scan the coefficients by applying various scan orders. This will be described with reference to FIG. 16 below.

Figure 16:
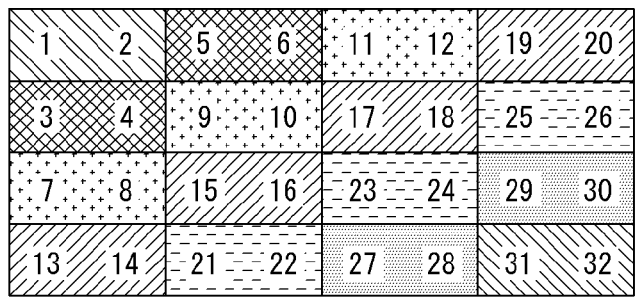
Figure 16:
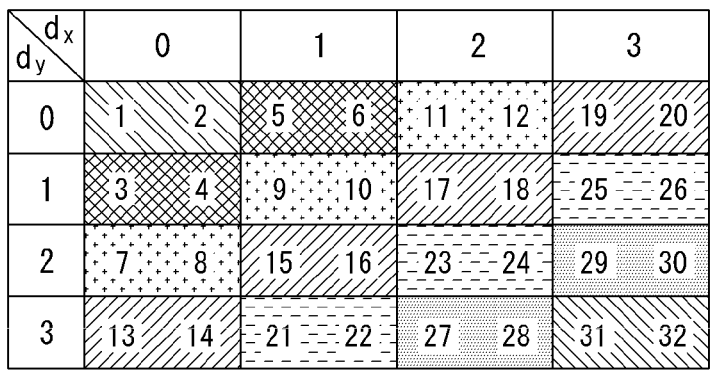

FIGS. 16 and 17 are diagrams for describing a method for determining a scan order for coefficients of a non-square block in units of a super-pixel as an embodiment to which the present disclosure is applied.

Referring to FIG. 16, it is assumed that the current processing block is the block having the 4×8 size. The encoder/decoder may split the current processing block in units of the super-pixel. Here, the super-pixel may represent a set of a specific number of coefficients (or pixels) and the specific number may be determined according to the ratio of the width and the height of the current block. The super-pixel may be referred to as a subblock, a sub group, a coefficient group, a sub coefficient group, etc. Since the ratio of the width and the height of the current block is 2, the super-pixel may be constituted by two pixels.

The encoder/decoder may configure the square block with the super-pixels, determine the scan order in units of the super-pixel by using the methods described in FIGS. 7 to 13 above, and scan the coefficients according to a random order in the super-pixel.

The encoder/decoder may apply the scan order for the square block having the 4×4 size according to the diagonal scan order in units of the super-pixel as illustrated in FIG. 16 and apply the scan order from the left side to the right side in each super-pixel.

Referring to FIG. 17, it is assumed that the current processing block is the block having the 8×4 size. Similarly, the encoder/decoder may split the current processing block in units of the super-pixel. Since the height is twice larger than the width, the encoder/decoder may configure the super-pixel by grouping two coefficients in the vertical direction (or height direction).

Table 3 below shows one example of the pseudo code to acquire the scan order by applying the methods described in FIGS. 16 and 17.

TABLE 3

```
[ scan_order, scan_pos ] = find_scan_order ( height, width )
if ( height ≥ width )
    splen = round ( height / width );
    norm_length = width;
else
    splen = round ( width / height );
    norm_length = height;
end
scan_idx = 1;
for d = 0 : ( ( norm_length - 1 ) + ( norm_length - 1 ) )
    sypos = d;
    if ( sypos ≥ norm_length )
        sypos = norm_length - 1;
    end
    sxpos = d - sypos;
    while ( sxpos < norm_length and sypos ≥ 0 )
        for i = 0 : ( splen - 1 )
            if ( height ≥ width )
                sypos_ex = ( sypos · splen ) + i;
                sxpos_ex = sxpos;
            else
                sypos_ex = sypos;
                sxpos_ex = ( sxpos · splen ) + i;
            end
            scan_order ( sypos_ex + 1, sxpos_ex + 1 ) = scan_idx;
            scan_pos ( scan_idx, : ) = [ ( sypos_ex + 1 ) ( sxpos_ex + 1 ) ];
            scan_idx = scan_idx + 1;
        end
        sypos = sypos - 1;
        sxpos = sxpos + 1;
    end
end
```

Referring to Table 3, splen is a parameter representing the length of the super-pixel. The splen may be determined according to the width and the height of the current processing block. For example, when the height is larger than the width, the super-pixel may be determined as a super-pixel which is long in the vertical direction and when the width is larger than the height, the super-pixel may be determined as a super-pixel which is long in the horizontal direction. In addition, norm_length is a parameter representing the length of one side for a block (i.e., square block) configured in units of the super-pixel. In Table 3 above, 'for-loop' in 'while loop' allocates the scan index to the coefficients at respective positions in the super-pixel.

The encoder/decoder may apply various scan orders in addition to the scan order. For example, the encoder/decoder may acquire number information of non-zero coefficients with respect to the coefficients at the respective positioned by using statistics of block transform coefficients having specific sizes (e.g., 4×8, 16×8, 32×32, etc.). In addition, the encoder/decoder may determine the scan order of coefficients in a descending order (or ascending order) of the corresponding number based on the number of acquired non-zero coefficients.

The encoder/decoder may represent a set of scan orders applicable to the h×w block as shown in Equation 10 below when the height and the width of $CG^d(i_0, i_1, \ldots, i_d)$ are h and w, respectively as shown in Equation 2 described above.

$$\Im = \{\Gamma_1, \Gamma_1, \ldots, \Gamma_{|\Im|}\} \quad \text{[Equation 10]}$$

Here, $\Im$ represents the set of applicable scan orders. In addition, $\Gamma_i$ (i=1, ..., |$\Im$|) may represent the scan orders and may correspond to the scan orders described in FIGS. 7 to 17 above. $\tau(CG^d (i_0, i_1, \ldots, i_d))$ of Equation 2 may satisfy $\tau(CG^d (i_0, i_1, \ldots, i_d)) \in \Im$.

Embodiment 3

In an embodiment of the present disclosure, a method for determining the scan order of the coefficient group is proposed. For example, the encoder/decoder may determine the scan order for four coefficient groups constituting $CG^1(1,1)$ in FIG. 9(c) above.

The encoder/decoder may scan the scan groups in the diagonal scan order as illustrated in FIG. 9(c) above. Further, the encoder/decoder may apply the scan method described in Examples 1 and 2 above in determining the scan order between the coefficient groups and apply the scan order having the random order.

FIG. 18 is a diagram illustrating a method for determining a scan order for coefficient groups as an embodiment to which the present disclosure is applied.

Referring to FIG. 18, the encoder/decoder may be configured to similarly use the scan order for the coefficient group and the scan order for the coefficients in the coefficient group or configured to separately use the respective scan orders.

As one example, referring to FIG. 18(a), the encoder/decoder may split the coefficient group into the blocks having the 4×2 size, apply the scan order generated by using Table 2 described above between the coefficient groups, and apply the scan order generated by using Table 1 described above in each coefficient group.

As another example, referring to FIG. 18(b), the encoder/decoder may split the coefficient group into the blocks having the 2×4 size and apply the scan order generated by using Table 2 described above similarly to the scan order between the coefficient groups and the scan order between the coefficients in the coefficient group.

As yet another example, referring to FIG. 18(c), the encoder/decoder may split the coefficient group into the blocks having the 2×4 size, apply the scan order generated by using Table 2 described above between the coefficient groups, and apply the scan order generated by using Table 3 described above in each coefficient group.

Figure 19:
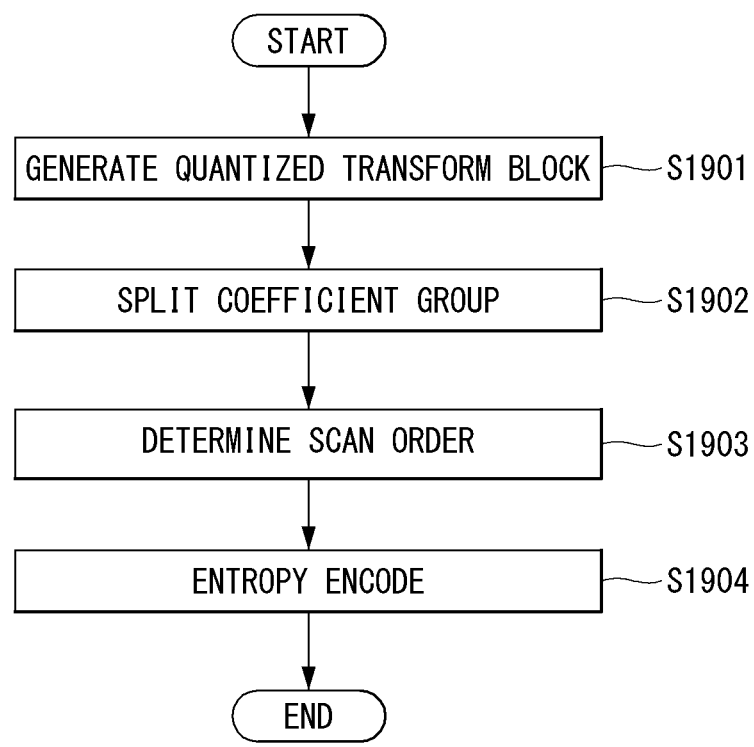
FIG. 19 illustrates a method for encoding an image according to an embodiment of the present disclosure.

FIG. 19 illustrates a method for encoding an image according to an embodiment of the present disclosure.

The encoder performs transform and quantization for a residual signal of a current processing block to generate a quantized transform block (S1901). Step S1901 may be performed similarly to steps S501 and S502 described in FIG. 5 above.

The encoder splits the quantized transform block into a plurality of coefficient groups (S1902).

As described above in FIGS. 9 and 10 above, the encoder may recursively (or hierarchically) split the current processing block in order to scan the transform coefficient. For example, the splitting of the quantized transform block into the plurality of coefficient groups may include hierarchically splitting the quantized transform block and splitting the quantized transform block into coefficient groups having a lower depth and the second scan order may include a scan order among coefficient groups having respective depths split from the quantized transform block.

Further, as described in FIGS. 16 and 17 above, the encoder may group the coefficients in units of a specific number of coefficients and then scan the coefficients by applying various scan orders. That is, when the quantized transform block is a non-square block, the quantized transform block may be split into coefficient groups constituted by a specific number of coefficients and the specific number may be determined according to a ratio of a width and a height of the quantized transform block.

The encoder determines a first scan order representing the scan order between the coefficients of the coefficient group (S1903).

The encoder may determine the first scan order by applying the methods described in FIGS. 12 to 18 above. For example, step S1903 may include determining a distance value of the respective coefficients of the coefficient group based on an upper left coefficient of the coefficient group and allocating a scan index to coefficients having the same distance value according to a predetermined order while sequentially increasing the distance value.

Further, as described in FIGS. 14 and 15 above, the encoder may allocate the scan order to the coefficients at respective positions in the non-square block in order to effectively reflect a frequency increase rate in a horizontal direction or a vertical direction. For example, the determining of the distance value of the respective coefficients of the coefficient group may include determining a horizontal increment representing an increase amount of a coordinate value in the horizontal direction of each coefficient and a vertical increment representing the increase amount of the coordinate value in the vertical direction based on the ratio of the width and the height of the coefficient group and the distance value of the respective coefficients may be determined by using a value acquired by summing up the horizontal increment and the vertical increment.

Further, when the width of the coefficient group is larger than the height, the horizontal increment may be determined as 1 and the vertical increment may be determined as 2 and when the height of the coefficient group is larger than the width, the horizontal increment may be determined as 2 and the vertical increment may be determined as 2.

The first scan order may be predefined (or configured) by the encoder and the encoder may transmit the first scan order to the decoder in units of a picture, a slice, a CTU, a coding unit, or a transform unit.

Further, the encoder may determine the second scan order representing the scan order among the plurality of coefficient groups. In this case, step S1903 may include determining the second scan order and the encoder may determine the second scan order by applying the methods described in FIGS. 12 to 18 above. The second scan order may be predefined (or configured) by the encoder and the encoder may transmit the second scan order to the decoder in units of the picture, the slice, the CTU, the coding unit, or the transform unit.

The encoder entropy encodes the coefficients of the quantized transform block according to the first scan order and the second scan order representing the scan order among the plurality of coefficient groups (S1904).

Figure 20:
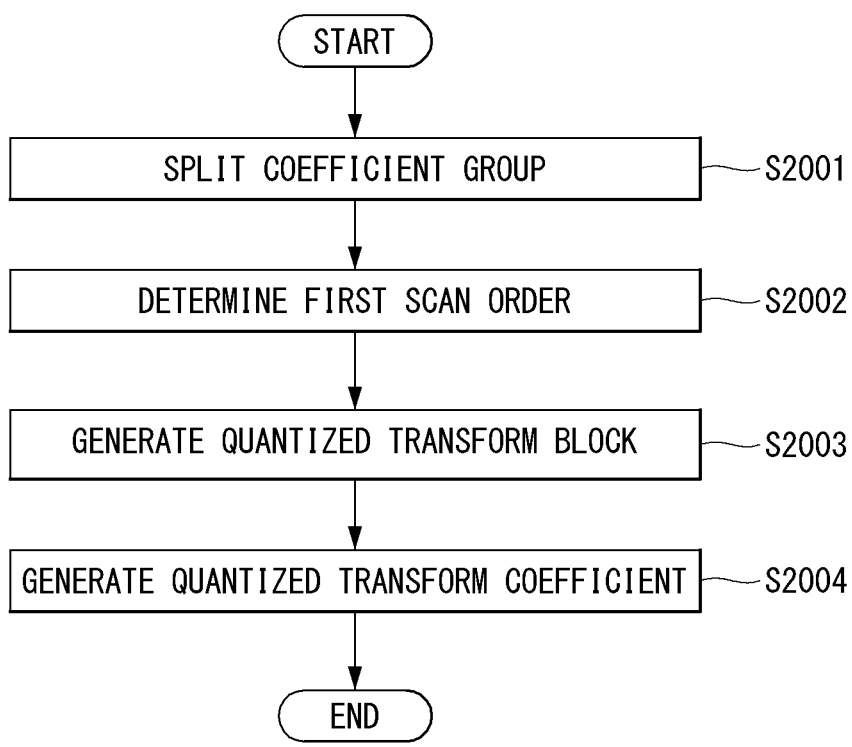
FIG. 20 illustrates a method for decoding an image according to an embodiment of the present disclosure.

FIG. 20 illustrates a method for decoding an image according to an embodiment of the present disclosure.

The decoder splits a current processing block into a plurality of coefficient groups (S2001).

As described above in FIGS. 9 and 10 above, the decoder may recursively (or hierarchically) split the current processing block in order to scan the transform coefficient. For example, the splitting of the current processing block into the plurality of coefficient groups may include hierarchically splitting the current processing block and splitting the current processing block into coefficient groups having a lower depth and the second scan order may include a scan order among coefficient groups having respective depths split from the current processing block.

Further, as described in FIGS. 16 and 17 above, the decoder may group the coefficients in units of a specific number of coefficients and then scan the coefficients by applying various scan orders. That is, when the current processing block is a non-square block, the current processing block may be split into coefficient groups constituted by a specific number of coefficients and the specific number may be determined according to a ratio of a width and a height of the current processing block.

The decoder determines a first scan order representing the scan order between the coefficients of the coefficient group (S2002).

The decoder may determine the first scan order by applying the methods described in FIGS. 12 to 18 above. For example, step S2002 may include determining a distance value of the respective coefficients of the coefficient group based on an upper left coefficient of the coefficient group and allocating a scan index to coefficients having the same distance value according to a predetermined order while sequentially increasing the distance value.

Further, as described in FIGS. 14 and 15 above, the decoder may allocate the scan order to the coefficients at respective positions in the non-square block in order to effectively reflect a frequency increase rate in a horizontal direction or a vertical direction. For example, the determining of the distance value of the respective coefficients of the coefficient group may include determining a horizontal increment representing an increase amount of a coordinate value in the horizontal direction of each coefficient and a vertical increment representing the increase amount of the coordinate value in the vertical direction based on the ratio of the width and the height of the coefficient group and the distance value of the respective coefficients may be determined by using a value acquired by summing up the horizontal increment and the vertical increment.

Further, when the width of the coefficient group is larger than the height, the horizontal increment may be determined as 1 and the vertical increment may be determined as 2 and when the height of the coefficient group is larger than the width, the horizontal increment may be determined as 2 and the vertical increment may be determined as 2.

The first scan order may be predefined (or configured) by the decoder and the decoder may transmit the first scan order to the decoder in units of a picture, a slice, a CTU, a coding unit, or a transform unit.

Further, the decoder may determine the second scan order representing the scan order among the plurality of coefficient groups. In this case, step S2002 may include determining the second scan order and the decoder may determine the second scan order by applying the methods described in FIGS. 12 to 18 above. The second scan order may be predefined (or configured) by the decoder and may be transmitted from the encoder to the decoder in units of a picture, a slice, a CTU, a coding unit, or a transform unit.

The decoder entropy decodes a bitstream output from the encoder to generate a quantized transform coefficient (S2003). Step S2003 may be performed similarly to step S601 described in FIG. 6 above.

The decoder arranges the coefficients of the quantized transform block according to the first scan order and the second scan order representing the scan order among the plurality of coefficient groups to generate the quantized transform block of the current processing block (S2004).

In addition, the decoder may acquire the transform block by dequantizing the quantized transform block. A dequantization method may adopt a known technique and a detailed description thereof will be omitted. In the image decoding method according to the embodiment described above, some step may be omitted or added and the image decoding method is not constrained even in the described order. Further, steps S2003 and S2004 may be separately performed or concurrently performed.

Figure 21:
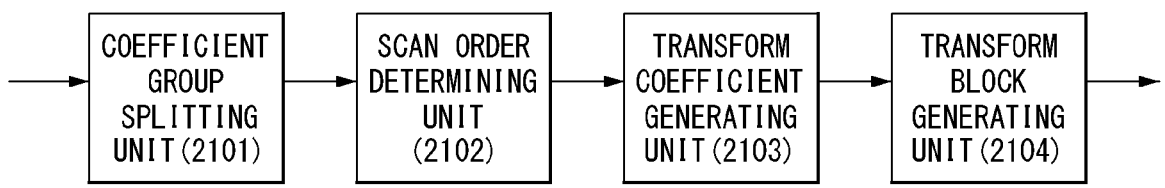
FIG. 21 illustrates a device for decoding an image according to an embodiment of the present disclosure.

FIG. 21 illustrates a device for decoding an image according to an embodiment of the present disclosure.

In FIG. 21, for convenience of description, a coefficient group splitting unit 2101, a scan order determining unit 2102, a transform coefficient generating unit 2103, and a transform block generating unit 2104 are illustrated as separate blocks, but the coefficient group splitting unit 2101, the scan order determining unit 2102, the transform coefficient generating unit 2103, and the transform block generating unit 2104 may be implemented as components included in the encoder and/or the decoder.

Referring to FIG. 21, the device for decoding an image according to the embodiment implements the functions, procedures, and/or methods proposed in FIGS. 5 to 20 above and further, perform scaling and transform processes to be described below. Specifically, the decoding device may be configured to include a coefficient group splitting unit 2101, a scan order determining unit 2102, a transform coefficient generating unit 2103, and a transform block generating unit 2104.

Detailed components of the device for decoding an image, which are illustrated in FIG. 21 are just one example and some of the illustrated detailed components may be included in another detailed component and together implemented and another component which is not illustrated may be added and together implemented.

The coefficient group splitting unit 2101 splits a current processing block into a plurality of coefficient groups.

As described above in FIGS. 9 and 10 above, the coefficient group splitting unit 2101 may recursively (or hierarchically) split the current processing block in order to scan the transform coefficient. For example, the coefficient group splitting unit 2101 hierarchically splits the current processing block to split the current processing block into coefficient groups having a lower depth and the second scan order may include a scan order among coefficient groups having respective depths split from the current processing block.

Further, as described in FIGS. 16 and 17 above, the coefficient group splitting unit 2101 may group the coefficients in units of a specific number of coefficients and then scan the coefficients by applying various scan orders. That is, when the current processing block is a non-square block, the current processing block may be split into coefficient groups constituted by a specific number of coefficients and the specific number may be determined according to a ratio of a width and a height of the current processing block.

The scan order determining unit 2102 determines a first scan order representing the scan order between the coefficients of the coefficient group.

The scan order determining unit 2102 may determine the first scan order by applying the methods described in FIGS. 12 to 18 above. For example, the scan order determining unit 2102 may determine a distance value of the respective coefficients of the coefficient group based on an upper left coefficient of the coefficient group and allocate a scan index to coefficients having the same distance value according to a predetermined order while sequentially increasing the distance value.

Further, as described in FIGS. 14 and 15 above, the scan order determining unit 2103 may allocate the scan order to the coefficients at respective positions in the non-square block in order to effectively reflect a frequency increase rate in a horizontal direction or a vertical direction. For example, the scan order determining unit 2102 may determine a horizontal increment representing an increase amount of a coordinate value in the horizontal direction of each coefficient and a vertical increment representing the increase amount of the coordinate value in the vertical direction based on the ratio of the width and the height of the coefficient group and the distance value of the respective coefficients may be determined by using a value acquired by summing up the horizontal increment and the vertical increment.

Further, when the width of the coefficient group is larger than the height, the horizontal increment may be determined as 1 and the vertical increment may be determined as 2 and when the height of the coefficient group is larger than the width, the horizontal increment may be determined as 2 and the vertical increment may be determined as 2.

The first scan order may be predefined (or configured) by the decoder and the decoder may transmit the first scan order to the decoder in units of a picture, a slice, a CTU, a coding unit, or a transform unit.

Further, the scan order determining unit 2102 may determine the second scan order representing the scan order among the plurality of coefficient groups. In other words, the scan order determining unit 2102 may include determining the second scan order and the scan order determining unit 2102 may determine the second scan order by applying the methods described in FIGS. 12 to 18 above. Further, the second scan order may be predefined (or configured) by the decoder and may be transmitted from the encoder to the decoder in units of a picture, a slice, a CTU, a coding unit, or a transform unit.

The transform coefficient generating unit 2103 entropy decodes a bitstream output from the encoder to generate a quantized transform coefficient. In this case, the same method as step S601 described in FIG. 6 above may be applied.

The transform block generating unit 2104 arranges the coefficients of the quantized transform block according to the first scan order and the second scan order representing the scan order among the plurality of coefficient groups to generate the quantized transform block of the current processing block.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Hereinabove, the preferred embodiments of the present disclosure are disclosed for an illustrative purpose and hereinafter, modifications, changes, substitutions, or additions of various other embodiments will be made within the technical spirit and the technical scope of the present disclosure disclosed in the appended claims by those skilled in the art.

The invention claimed is:

1. A method for decoding an image including a non-square block, the method comprising:
   splitting a current block into a plurality of coefficient groups based on the current block being the non-square block, wherein the plurality of coefficient groups include a non-square coefficient group;
   obtaining coefficients corresponding to the plurality of coefficient groups based on a first scan order and a second scan order, wherein the first scan order represents a scan order among coefficients of the non-square coefficient group, and wherein the second scan order represents a scan order among the plurality of coefficient groups; and
   reconstructing the image based on the obtained coefficients,
   wherein the first scan order is determined based on a distance value of coefficients within the non-square coefficient group, the distance value being based on a left upper coefficient of the non-square coefficient group,
   wherein the second scan order is determined based on a distance of the non-square coefficient group within the plurality of coefficient groups,
   wherein the distance value of coefficients is calculated by summation of a horizontal coordinate increment and a vertical coordinate increment,
   wherein a scan index is allocated to the coefficients in a coefficient group in order of which the distance value of coefficient increases according to a diagonal scan order,
   wherein coefficients within the non-square coefficient group are scanned from a lower left side to an upper right side on a scan line having the same distance value,
   wherein when the width of the coefficient group is larger than the height, the horizontal coordinate increment is determined as the ratio of width and height, and the vertical coordinate increment is determined as 1, and
   wherein when the height of the coefficient group is larger than the width, the horizontal coordinate increment is determined as 1, and the vertical coordinate increment is determined as the ratio of height and width.

2. A method for encoding an image, the method comprising:
- generating coefficients by performing a transformation on a current block;
- splitting the coefficients into a plurality of coefficient groups based on the current block being a non-square block, wherein the plurality of coefficient groups include a non-square coefficient group; and
- performing quantization and entropy encoding on the coefficients based on a first scan order and a second scan order,
- wherein the first scan order represents a scan order among coefficients of the non-square coefficient group, and wherein the second scan order represents a scan order among the plurality of coefficient groups,
- wherein the first scan order is determined based on a distance value of coefficients within the non-square coefficient group, the distance value being based on a left upper coefficient of the non-square coefficient group,
- wherein the second scan order is determined based on a distance of the non-square coefficient group within the plurality of coefficient groups,
- wherein the distance value of coefficients is calculated by summation of a horizontal coordinate increment and a vertical coordinate increment,
- wherein a scan index is allocated to the coefficients in a coefficient group in order of which the distance value of coefficient increases according to a diagonal scan order
- wherein coefficients within the non-square coefficient group are scanned from a lower left side to an upper right side on a scan line having the same distance value,
- wherein when the width of the coefficient group is larger than the height, the horizontal coordinate increment is determined as the ratio of width and height, and the vertical coordinate increment is determined as 1, and
- wherein when the height of the coefficient group is larger than the width, the horizontal coordinate increment is determined as 1, and the vertical coordinate increment is determined as the ratio of height and width.

3. A non-transitory computer-readable medium storing video information generated by an encoding method, the encoding method comprising:
- generating coefficients by performing a transformation on a current block;
- splitting the coefficients into a plurality of coefficient groups based on the current block being a non-square block, wherein the plurality of coefficient groups include a non-square coefficient group; and
- performing quantization and entropy encoding on the coefficients based on a first scan order and a second scan order,
- wherein the first scan order represents a scan order among coefficients of the non-square coefficient group, and wherein the second scan order represents a scan order among the plurality of coefficient groups,
- wherein the first scan order is determined based on a distance value of coefficients within the non-square coefficient group, the distance value being based on a left upper coefficient of the non-square coefficient group,
- wherein the second scan order is determined based on a distance of the non-square coefficient group within the plurality of coefficient groups,
- wherein the distance value of coefficients is calculated by summation of a horizontal coordinate increment and a vertical coordinate increment,
- wherein a scan index is allocated to the coefficients in a coefficient group in order of which the distance value of coefficient increases according to a diagonal scan order,
- wherein coefficients within the non-square coefficient group are scanned from a lower left side to an upper right side on a scan line having the same distance value,
- when the width of the coefficient group is larger than the height, the horizontal coordinate increment is determined as the ratio of width and height, and the vertical coordinate increment is determined as 1, and
- wherein when the height of the coefficient group is larger than the width, the horizontal coordinate increment is determined as 1, and the vertical coordinate increment is determined as the ratio of height and width.

4. The method of claim 1, wherein the first scan order or the second scan order is determined based on a size or a shape of the non-square coefficient group.

5. The method of claim 2, wherein the first scan order or the second scan order is determined based on a size or a shape of the non-square coefficient group.

* * * * *